(12) United States Patent
Konuma et al.

(10) Patent No.: US 8,942,540 B2
(45) Date of Patent: Jan. 27, 2015

(54) INTERESTING SECTION EXTRACTING DEVICE, INTERESTING SECTION EXTRACTING METHOD

(75) Inventors: Tomohiro Konuma, Osaka (JP); Ryouichi Kawanishi, Kyoto (JP); Tsutomu Uenoyama, Osaka (JP)

(73) Assignee: Panasonic Intellectual Property Corporation of America, Torrance, CA (US)

( * ) Notice: Subject to any disclaimer, the term of this patent is extended or adjusted under 35 U.S.C. 154(b) by 138 days.

(21) Appl. No.: 13/582,206

(22) PCT Filed: Oct. 28, 2011

(86) PCT No.: PCT/JP2011/006031
§ 371 (c)(1),
(2), (4) Date: Aug. 31, 2012

(87) PCT Pub. No.: WO2012/093430
PCT Pub. Date: Jul. 12, 2012

(65) Prior Publication Data
US 2012/0321282 A1 Dec. 20, 2012

(30) Foreign Application Priority Data
Jan. 5, 2011 (JP) .................. 2011-000839

(51) Int. Cl.
*H04N 5/92* (2006.01)
*H04N 5/14* (2006.01)
(Continued)

(52) U.S. Cl.
CPC ............... *H04N 5/147* (2013.01); *G10L 99/00* (2013.01); *H04N 21/4394* (2013.01);
(Continued)

(58) Field of Classification Search
None
See application file for complete search history.

(56) References Cited

U.S. PATENT DOCUMENTS

| 6,404,925 B1 | 6/2002 | Foote et al. |
| 2002/0061136 A1 | 5/2002 | Shibata et al. |

(Continued)

FOREIGN PATENT DOCUMENTS

| CN | 1787077 A | 6/2006 |
| CN | 101916568 A | 12/2010 |

(Continued)

OTHER PUBLICATIONS

International Search Report issued Jan. 10, 2012 in corresponding International Application No. PCT/JP2011/006031.

(Continued)

*Primary Examiner* — William C Vaughn, Jr.
*Assistant Examiner* — Eileen Adams
(74) *Attorney, Agent, or Firm* — Wenderoth, Lind & Ponack, L.L.P.

(57) ABSTRACT

An interesting section extracting device extracts an interesting section of interest to a user from a video file with reference to an audio signal included in the video file such that a specified time is included in the interesting section. The interesting section extracting device includes an interface device that obtains the specified time; and a likelihood vector generating unit that calculates, in one-to-one correspondence with first unit sections of the audio signal, likelihoods for anchor models that respectively represent features of a plurality of types of sound pieces and generates likelihood vectors having the calculated likelihoods as components thereof. An interesting section extracting unit calculates a first feature section as candidate section, which is candidate for the interesting section to be extracted, by using likelihood vectors and extract, as the interesting section, part of the first feature section including the specified time.

12 Claims, 18 Drawing Sheets

(51) Int. Cl.
  *G10L 99/00* (2013.01)
  *H04N 21/439* (2011.01)
  *H04N 21/845* (2011.01)
  *G06F 17/30* (2006.01)
  *G11B 27/034* (2006.01)
  *G11B 27/28* (2006.01)
  *G10L 25/81* (2013.01)

(52) U.S. Cl.
  CPC ..... *H04N 21/8456* (2013.01); *G06F 17/30787* (2013.01); *G11B 27/034* (2013.01); *G11B 27/28* (2013.01); *G10L 25/81* (2013.01)
  USPC ........................................................ 386/248

(56) References Cited

U.S. PATENT DOCUMENTS

| | | |
|---|---|---|
| 2005/0249412 A1 | 11/2005 | Radhakrishnan et al. |
| 2005/0251532 A1 | 11/2005 | Radhakrishnan et al. |
| 2006/0114992 A1 | 6/2006 | Shibata et al. |
| 2008/0215324 A1 | 9/2008 | Hirohata |
| 2009/0025538 A1* | 1/2009 | Arimoto ........................ 84/605 |
| 2009/0234878 A1* | 9/2009 | Herz et al. ..................... 707/102 |
| 2010/0211200 A1* | 8/2010 | Kobayashi ..................... 700/94 |

FOREIGN PATENT DOCUMENTS

| | | |
|---|---|---|
| JP | 3-80782 | 4/1991 |
| JP | 2000-298498 | 10/2000 |
| JP | 2001-57660 | 2/2001 |
| JP | 2002-140712 | 5/2002 |
| JP | 2005-331940 | 12/2005 |
| JP | 2008-22103 | 1/2008 |
| JP | 2008-175955 | 7/2008 |
| JP | 2008-185626 | 8/2008 |
| WO | 2011/033597 | 3/2011 |

OTHER PUBLICATIONS

Chinese Office Action for Application No. 201180012516.2 issued Aug. 4, 2014 (with partial English translation).

* cited by examiner

FIG. 3

| First unit section | Feature | | | | |
|---|---|---|---|---|---|
| | M(1) | M(2) | M(3) | ・・・ | M(26) |
| 0〜10ms | 0.450 | 0.505 | 0.288 | ・・・ | 0.373 |
| 10〜20ms | 0.489 | 0.502 | 0.314 | ・・・ | 0.419 |
| 20〜30ms | 0.530 | 0.527 | 0.287 | ・・・ | 0.384 |
| ⋮ | ⋮ | ⋮ | ⋮ | ⋮ | ⋮ |
| 500〜510ms | 0.715 | 0.978 | 0.288 | ・・・ | 0.141 |
| ⋮ | ⋮ | ⋮ | ⋮ | ⋮ | ⋮ |
| 990〜1000ms | − | − | − | ・・・ | − |

} 100 feature vectors

FIG. 4

| Anchor model | Feature appearance probability function |
|---|---|
| A1 | $b_{A1}(M)$ |
| A2 | $b_{A2}(M)$ |
| A3 | $b_{A3}(M)$ |
| ... | ... |
| A1024 | $b_{A1024}(M)$ |

FIG. 8
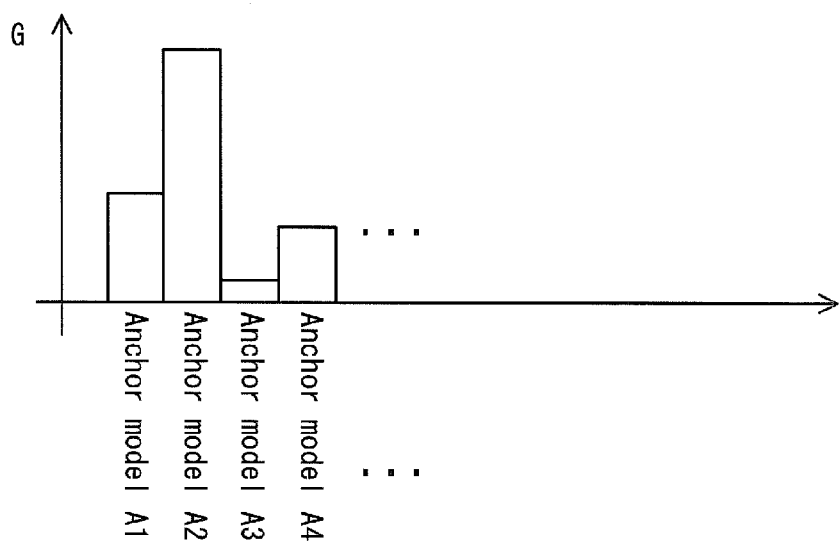
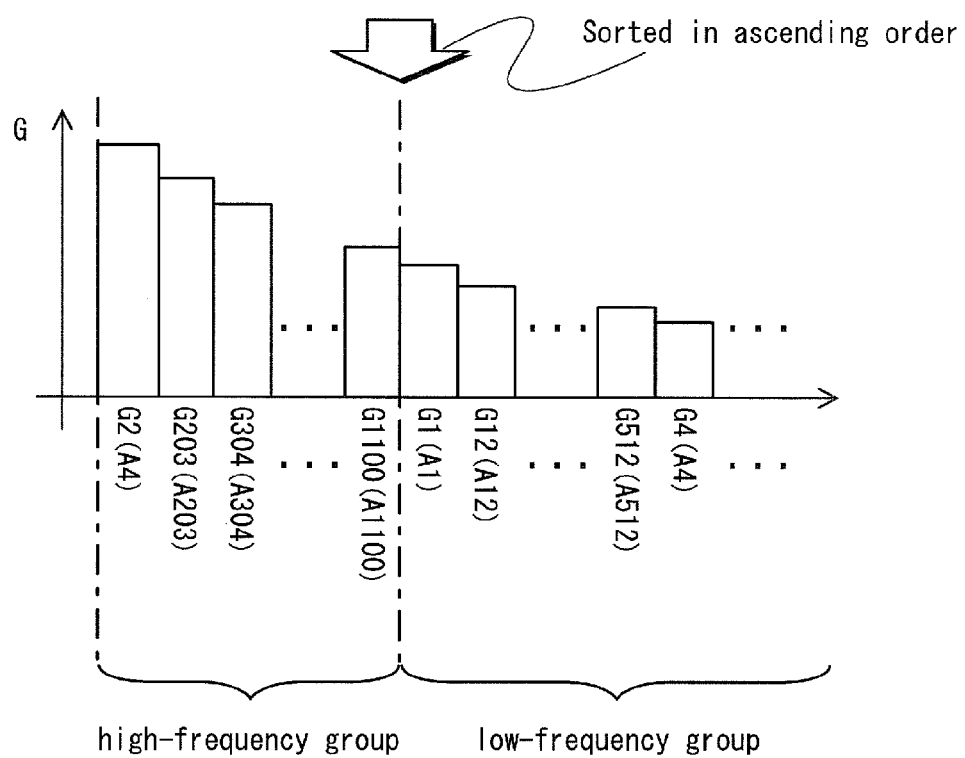

FIG. 10
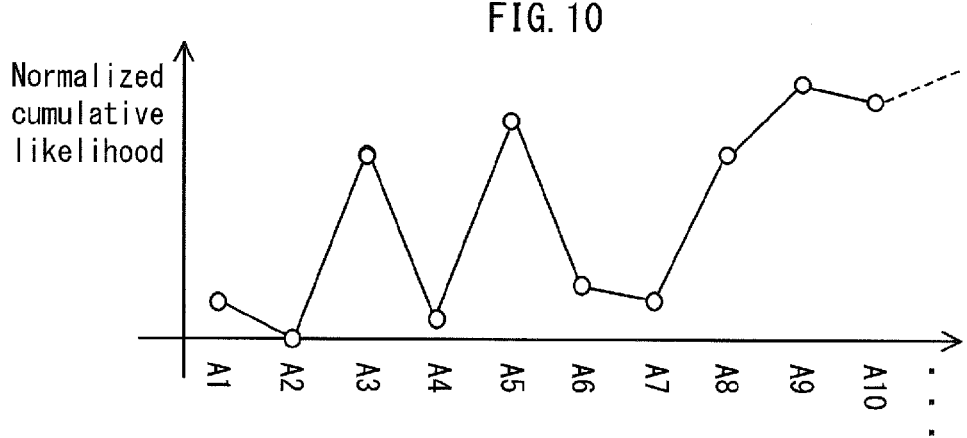
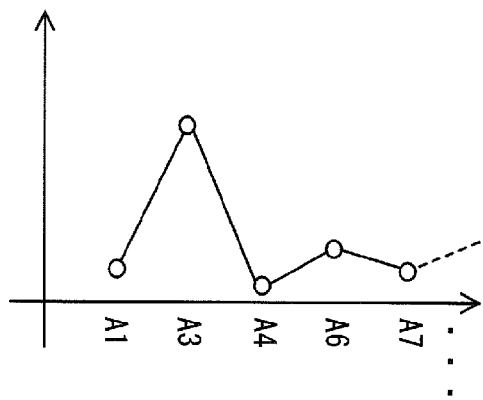 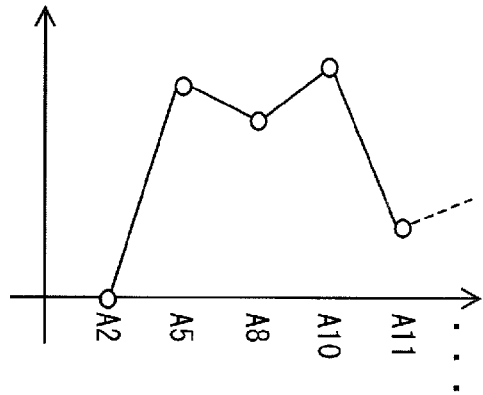
 
Low-frequency vector NFl          High-frequency vector NFh

INTERESTING SECTION EXTRACTING DEVICE, INTERESTING SECTION EXTRACTING METHOD

TECHNICAL FIELD

The present invention relates to a technology of extracting, from an audio-visual content, an interesting section that is a target of interest of a user, and in particular to a technology using an audio signal.

BACKGROUNG OF THE INVENTION

Background Art

With regard to a video recorder such as a digital camera, there is a demand for a function to extract, from an audio-visual (AV) content captured by a user, only a section that is interesting to the user (hereinafter, the section is referred to as an "interesting section"), removing other unnecessary sections.

As one example of such a function, there has been a conventional video recorder that can extract an interesting section in such a manner that, when a time which is intended to be a start time of the interesting section is reached while a user is watching an AV content, the user determines the start time of the interesting section by operating a controller (for example, by depressing an input button of the controller); and when a time which is intended to be an end time of the interesting section is reached, the user determines the end time by operating the controller again.

With this video recorder, to extract the interesting section as desired, the user needs to operate the controller at appropriate timings while watching the AV content. The user is required to have skills to operate the controller appropriately while watching the AV content. If the user fails to determine the start and end times of the interesting section appropriately, the user needs to repeat the same operation of the controller again for appropriate determinations while watching the AV content. It often requires time and effort before the user can successfully extract an interesting section.

In view of the above, a video editing device having a function to set an in-point and an out-point has been proposed. In this video editing device, an offset time is added to a specified time of the user, wherein the offset time is set by the user in advance taking account of the type of the content (see Patent Literature 1). In this video editing device, a setting can be made so that the time of the in-point is brought forward from the specified time of the user by the offset time. Thus, if the user misses the timing to specify the in-time, a desired in-point can be specified and an appropriate interesting section can be extracted.

As another example, an interesting section extracting method has been proposed. According to this interesting section extracting method, an audio feature condition for a start time (in-point) of the interesting section and an audio feature condition for an end time (out-point) of the interesting section are set in advance, and the in-point and the out-point are determined based on these audio feature conditions so that the interesting section can be extracted (see Patent Literature 2).

Citation List

Patent Literature

Patent Literature 1
Japanese Patent Application Publication No. 2001-057660

Patent Literature 2
Japanese Patent Application Publication No. 03-080782

SUMMARY OF INVENTION

However, in the method described in Patent Literature 1, typically an appropriate offset time needs to be set to different lengths depending on the type of the AV content. For example, in the case where an interesting section is extracted from each of a plurality of types of AV contents to create digests, it is necessary to extract the interesting section after setting an offset time for each of the plurality of types of AV contents. The work of setting a different offset time for each of the plurality of types of AV contents requires a lot of time and effort for the user.

Also, in the method described in Patent Literature 2, the audio feature conditions for the in-point and out-point need to be set depending on the type of the AV content. Thus when an interesting section is to be extracted from each of a plurality of types of AV contents, it is necessary to set the audio feature conditions for the in-point and out-point for each of the plurality of types of AV contents. Accordingly, the work of setting the audio feature conditions for the in-point and out-point for each type of AV content may require a lot of time and effort for the user.

It is accordingly an object of the present invention to reduce a work load on the user when extracting an interesting section from an AV content.

The above object is fulfilled by an interesting section extracting device for extracting an interesting section interesting to a user from a video file with reference to an audio signal included in the video file such that a specified time is included in the interesting section, the interesting section extracting device comprising: an anchor model storage unit storing anchor models that respectively represent features of a plurality of types of sound pieces; a specified time obtaining unit configured to obtain the specified time; a likelihood vector generating unit configured to calculate likelihoods for feature vectors that represent features of the audio signal, in one-to-one correspondence with unit sections of the audio signal by using the anchor models, and generate likelihood vectors having the calculated likelihoods as components thereof; and an interesting section extracting unit configured to calculate a candidate section, which is a candidate for the interesting section to be extracted from the video file, by using the likelihood vectors and extract, as the interesting section, a part or a whole of the candidate section including the specified time.

With the above structure, an interesting section is extracted appropriately merely by specifying a time as the specified time when the interesting section is to be extracted from an AV content. This makes it possible to reduce a work load on the user when extracting an interesting section from an AV content.

The above interesting section extracting device may further comprise: a frequency vector generating unit configured to generate frequency vectors from N likelihood vectors generated by the likelihood vector generating unit, wherein each of the unit sections is a first unit section, N is a natural number of 2 or more, and the N likelihood vectors are generated from a second unit section of the audio signal that is N times the first unit section in length, wherein the frequency vectors are used in the calculation of the candidate section.

The above interesting section extracting device may further comprise: a component classification unit configured to classify components of the frequency vectors into a plurality of component groups; and a feature section calculating unit configured to calculate a plurality of feature sections by using the plurality of component groups, respectively, wherein the candidate section is defined by the plurality of feature sections.

With the above structure, components of the frequency vectors generated from all sections of the audio signal are classified into a plurality of component groups based on components of a centroid vector of likelihood vectors, wherein the components of the centroid vector represent appearance frequencies of the sound pieces included in the whole of the AV content. Furthermore, a candidate section is determined based on the feature section calculated based on the plurality of component groups, and the components are classified depending on the difference of property between the sounds. This makes it possible to determine the candidate section from the feature section that is calculated based on components of the same property of sound, enabling the property of the sound to be reflected on the feature section.

In the above interesting section extracting device, the component classification unit may calculate a centroid vector from likelihood vectors of all sections of the audio signal, and classifies the components of the frequency vectors into a first component group and a second component group in accordance with size of each component of the centroid vector, and the feature section calculating unit calculates a first feature section by using one or more components of the centroid vector belonging to the first component group, and calculates a second feature section by using one or more components of the centroid vector belonging to the second component group.

With the above structure, components of the frequency vectors corresponding to anchor models corresponding to a component of the centroid vector equal to or larger than a predetermined amount are classified into the first component group, and components of the frequency vectors corresponding to anchor models corresponding to a component of the centroid vector smaller than the predetermined amount are classified into the second component group, and the feature section calculating unit calculates the first feature section based on the first component group and calculates the second feature section based on the second component group. This makes it possible to calculate, based on the components belonging to the first component group, the first feature section which is a duration for which a sound continues in a stable manner, and calculate, based on the components belonging to the second component group, the second feature section which is a duration for which a sudden sound continues. Accordingly, this makes it possible to extract an interesting section that includes both the duration for which a sound continues in a stable manner and the duration for which a sudden sound continues.

In the above interesting section extracting device, the interesting section may be a section that is included in the first feature section and includes the second feature section.

With the above structure, the interesting section is included in the first feature section, and at the same time, it includes the second feature section. Accordingly, it is possible to extract accurately an interesting section that includes a duration for which a sudden sound continues, thus making it possible to extract an interesting section that includes both the duration for which a sound continues in a stable manner and the duration for which a sudden sound continues.

The above interesting section extracting device may further comprise: an interesting section length obtaining unit configured to obtain an interesting section length which is a length set in advance for the interesting section by the user; and a feature time extracting unit configured to search the second feature section for a feature time by sequentially shifting time by the second unit section from the specified time and extract the feature time, wherein the interesting section extracting unit judges whether or not a target time belongs to the first feature section, and a length between the target time and the specified time is shorter than a predetermined interesting section length, by sequentially shifting time by the second unit section from the specified time toward the feature time extracted by the feature time extracting unit, then upon judging that the target time belongs to the first feature section and the length between the target time and the specified time is shorter than the predetermined interesting section length, determines the second unit section including the target time as the interesting section.

With the above structure, when the length of the first feature section is shorter than a predetermined length of the interesting section that has been set by the user in advance, it is possible to reduce a processing load on the interesting section extracting unit.

In the above interesting section extracting device, the video file may correspond to a video representing one content.

With the above structure, the video file corresponds to a video representing one content. This makes it possible to extract the first and second feature sections from one whole content, thus making it possible to extract an interesting section corresponding to the content more accurately.

In the above interesting section extracting device, the interesting section extracting unit may store a plurality of interesting sections, which correspond respectively to a plurality of specified times, in a state of being arranged in an order of the plurality of specified times into an external storage device.

With the above structure, when creating a digest video containing video images of interesting sections to be displayed sequentially in an order of specified times, there is no need to perform the process of associating time information with interesting section data to obtain the interesting section data from an external storage device, thus making it possible to reduce a load on the process of creating a digest video.

In the above interesting section extracting device, the specified time obtaining unit may obtain the plurality of specified times automatically from sections specified by the user, based on variation over time of features of a plurality of pieces of image data that correspond to the sections and are included in the video file.

With the above structure, the user only needs to specify times as specified times for interesting sections and roughly specify sections including the specified times in order for the specified time obtaining unit to obtain specified times automatically from the sections specified by the user, thus making it possible to reduce a load on the user in specifying times for interesting sections.

The above object is also fulfilled by an interesting section extracting method for extracting an interesting section interesting to a user from a video file with reference to an audio signal included in the video file such that a specified time is included in the interesting section, the interesting section extracting method comprising: storing anchor models that respectively represent features of a plurality of types of sound pieces; obtaining the specified time; calculating, in one-to-one correspondence with unit sections of the audio signal, likelihoods for feature vectors representing features of the audio signal by using the anchor models and generating likelihood vectors having the calculated likelihoods as respective components thereof; and calculating a candidate section, which is a candidate for the interesting section to be extracted from the video file, by using the likelihood vectors and extracting, as the interesting section, a part or a whole of the candidate section including the specified time.

With the above structure, the user only needs to specify a time as a specified time in order for the interesting section to be extracted.

The above object is further fulfilled by a program causing a computer to perform an interesting section extraction process for extracting an interesting section interesting to a user from a video file with reference to an audio signal included in the video file such that a specified time is included in the interesting section, the interesting section extraction process comprising: storing anchor models that respectively represent features of a plurality of types of sound pieces; obtaining the specified time; calculating, in one-to-one correspondence with unit sections of the audio signal, likelihoods for feature vectors representing features of the audio signal by using the anchor models and generating likelihood vectors having the calculated likelihoods as respective components thereof; and calculating a candidate section, which is a candidate for the interesting section to be extracted from the video file, by using the likelihood vectors and extracting, as the interesting section, a part or a whole of the candidate section including the specified time.

With the above structure, the user only needs to specify a time as a specified time in order for the interesting section to be extracted.

The above object is further fulfilled by an interesting section extracting integrated circuit for extracting an interesting section interesting to a user from a video file with reference to an audio signal included in the video file such that a specified time is included in the interesting section, the interesting section extracting integrated circuit comprising: an anchor model storage unit storing anchor models that respectively represent features of a plurality of types of sound pieces; a specified time obtaining unit configured to obtain the specified time; a likelihood vector generating unit configured to calculate, in one-to-one correspondence with unit sections of the audio signal, likelihoods for feature vectors representing features of the audio signal by using the anchor models and generate likelihood vectors having the calculated likelihoods as respective components thereof; and an interesting section extracting unit configured to calculate a candidate section, which is a candidate for the interesting section to be extracted from the video file, by using the likelihood vectors and extract, as the interesting section, a part or a whole of the candidate section including the specified time.

With the above structure, it is possible to miniaturize the device to be loaded.

BRIEF DESCRIPTION OF DRAWINGS

FIG. 3 illustrates an example of feature vectors in the embodiment.

FIG. 4 illustrates an example of anchor models in the embodiment.

FIG. 8 illustrates an operation of a component classification unit of the embodiment.

FIG. 10 illustrates low-frequency vectors and high-frequency vectors in the embodiment.

DETAILED DESCRIPTION OF THE INVENTION

<Embodiment>
<1> Summary

The interesting section extracting device of the present embodiment: generates, for each first unit section (10 msec) of an audio signal included in a video file, feature vectors that represent the features of the audio signal; calculates likelihoods for the feature vectors by using a plurality of types of anchor models Ar; generates likelihood vectors whose components are the calculated likelihoods; classifies the components of the likelihood vectors into two component groups; and calculates end times of the first feature section (candidate section) and the second feature section based on the components belonging to the component groups.

Figure 1:
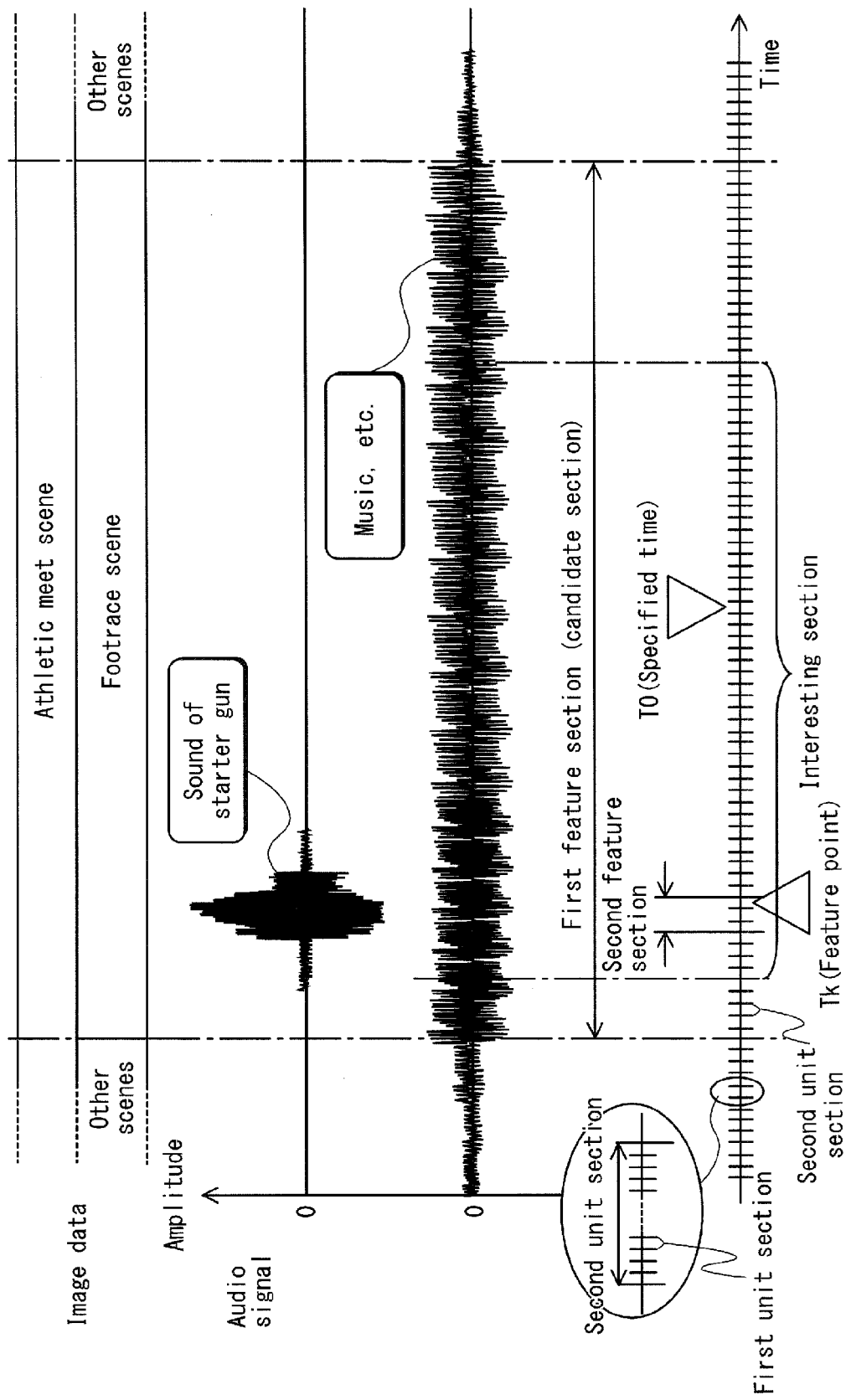
FIG. 1 illustrates an outline of an image editing device in which an interesting section extracting device of an embodiment is loaded.

For example, assume a video file which contains scenes of an athletic meet as illustrated in FIG. 1. Assume furthermore that a user attempts to edit the video file to extract a scene that extends over a predetermined period from before to after the start time of a footrace. In that case, the user specifies a time near the start time of the footrace included in the footrace scene, and then extracts an interesting section that is a partial section of a first feature section, wherein the interesting section includes the user-specified time and the first feature section corresponds to the whole footrace scene.

Furthermore, the interesting section extracting device of the present embodiment can extract, as the interesting section, a section that includes a gun-firing scene (the second feature section illustrated in FIG. 1) which announces the start of the footrace. Note that in the present embodiment, the interesting section is extracted in a unit of the second unit section (each being one second) as the minimum unit, wherein the length of the second unit section is 100 times that of the first unit section. Also, the interesting section extracting device of the present embodiment sets, as appropriate, a duration for which a sudden sound such as a sound of the starter gun continues, and obtains merely an end time (feature point Tk) of the second feature section, regarding a time earlier than the end time by the duration as the start time of the second feature section.

<2> Data

The following explains the data used by the interesting section extracting device of the present embodiment.

<2-1> Video File

Figure 2A:
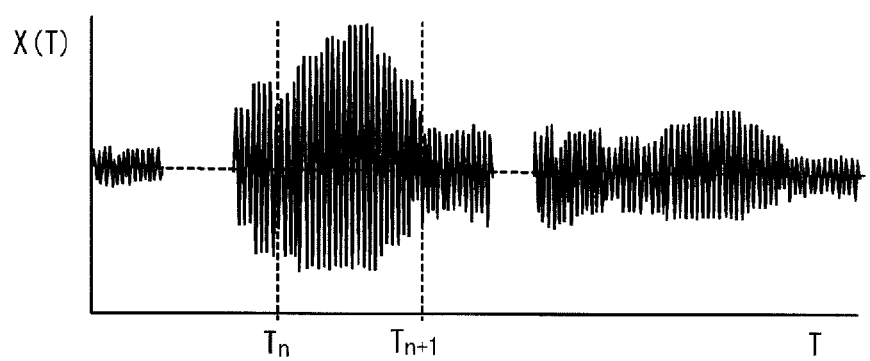
FIGS. 2A to 2C illustrate a method of calculating feature vectors in the embodiment.

The video file includes an audio signal and a plurality of pieces of image data. The audio signal has a waveform as illustrated in FIG. 2A. Note that the audio signal is a time series of amplitude values.

<2-2> Feature Vector

The following describes a summary of generating feature vectors M from the audio signal.

Figure 2B:
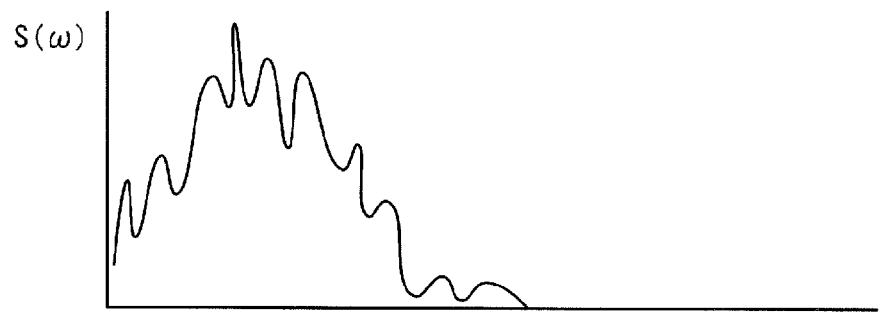

First, as illustrated in FIG. 2A, a power spectrum $S(\omega)$ is calculated for each first unit section of the audio signal extracted by an audio extracting device 102, wherein each first unit section extends over 10 msec from time $T_n$ to time $T_{n+1}$ (see FIG. 2B).

Figure 2C:
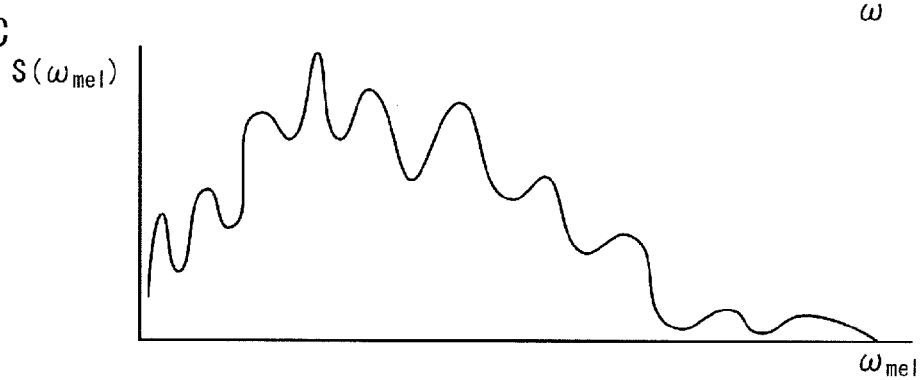

Subsequently, the horizontal axis of the power spectrum $S(\omega)$ is converted from a real frequency $\omega$ to a Mel frequency $\omega_{mel}$ (see FIG. 2C).

Following this, a vector (hereinafter referred to as a "feature vector"), which is composed of 26 MFCCs (Mel-Frequency Cepstrum Coefficients) in the first unit section, is calculated from the power spectrum $S(\omega_{mel})$ whose horizontal axis has been converted to the Mel frequency $\omega_{mel}$.

This feature vector M is calculated for each first unit section (10 msec), as illustrated in FIG. 3. As a result, 100 feature vectors M are generated from a portion of the audio signal that extends over from time "0 sec" to time "1 sec".

<2-3> Anchor Model

Anchor models of the present embodiment represent the features of 1024 types of sound pieces on which likelihood calculation is based, and the anchor model is created for each sound piece. Each anchor model is composed of parameters that define the anchor model.

In the present embodiment, anchor models Ar are created based on GMM (Gaussian Mixture Model).

As illustrated in FIG. 4, the anchor models Ar are composed of respective feature appearance probability functions $b_{Ar}(M)$ that correspond to the 1024 types of sound pieces in the first unit sections, respectively. The feature appearance probability functions $b_{Ar}$ are probability functions that correspond to the respective anchor models Ar. The feature appearance probability functions $b_{Ar}(M)$ are used to calculate likelihoods, with MFCC-26-dimensional vectors (feature vectors) M being used as the arguments. Note that it is not distinguished which anchor model corresponds to which sound piece.

<2-4> Likelihood Vector

Likelihood vectors F have likelihoods Lr as their components. The likelihoods Lr are calculated in correspondence with the feature vectors M that represent the features of the audio signal, by using the anchor models Ar (r=1, 2, . . . , 1024) that correspond to the plurality of types of sound pieces, respectively. Accordingly, the likelihood vectors are represented by 1024-dimensional vectors.

The feature vectors M are generated for each first unit section of the audio signal extracted by the audio extracting device 102, as described above in <2-3>.

Figure 5:
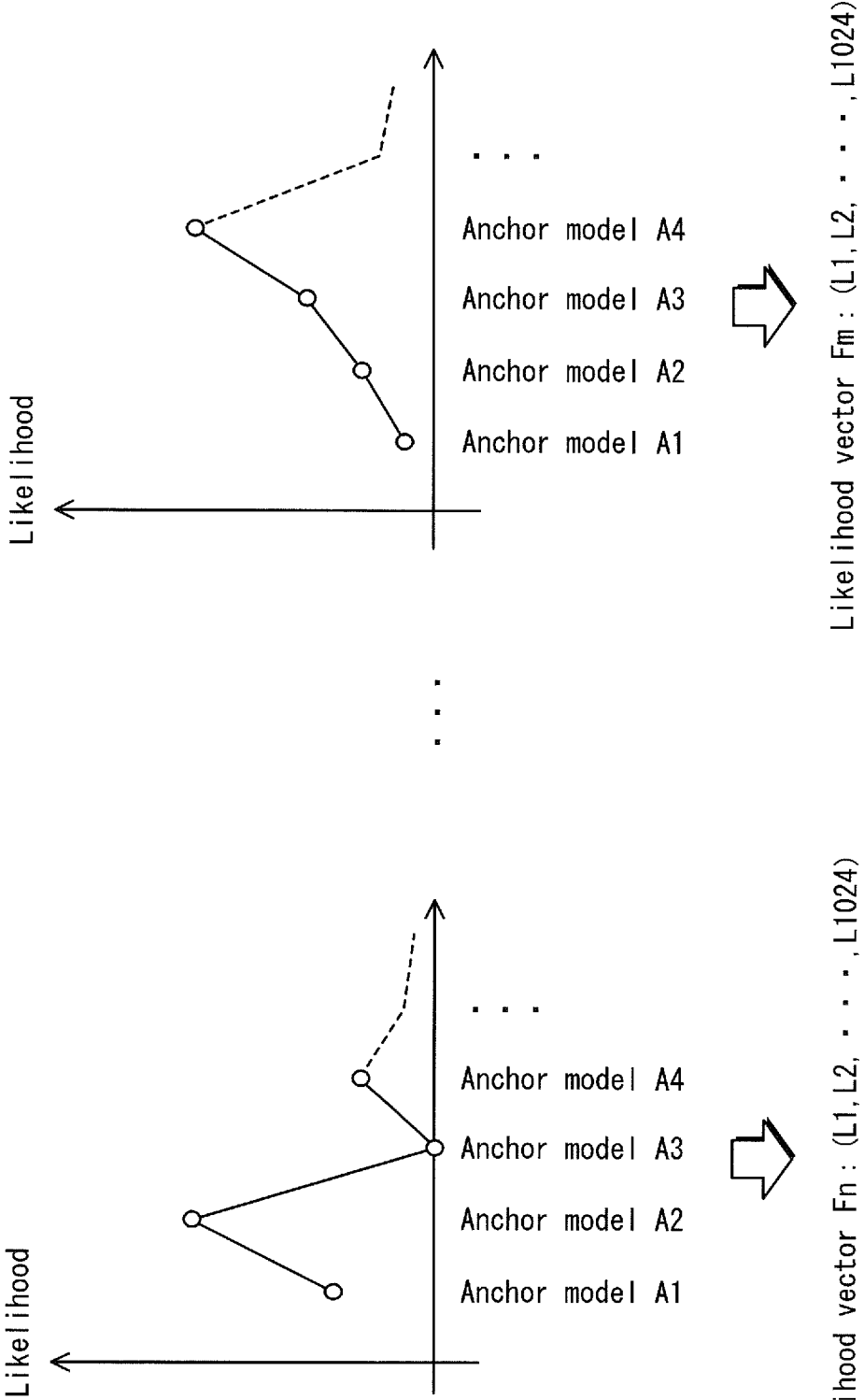
FIG. 5 illustrates an example of likelihood vectors in the embodiment.

FIG. 5 illustrates likelihood vectors Fn and Fm (n<m) that are calculated by using anchor models Ar that correspond to the 1024 types of sound pieces, respectively. In FIG. 5, the vertical axis represents the likelihood; and the horizontal axis represents the anchor models Ar. The likelihood vector Fn corresponds to the $n^{th}$ first unit section (namely, a section between time "(10×n) msec" and time "(10×(n+1)) msec"), and the likelihood vector Fm corresponds to the $m^{th}$ first unit section (namely, a section between time "(10×m) msec" and time "(10×(m+1)) msec"), wherein the ordinal numbers n and m are counted from time 0 (see FIG. 2A). As illustrated in FIG. 5, the likelihood vector F changes over time of the target audio signal.

<3> Structure

Figure 6:
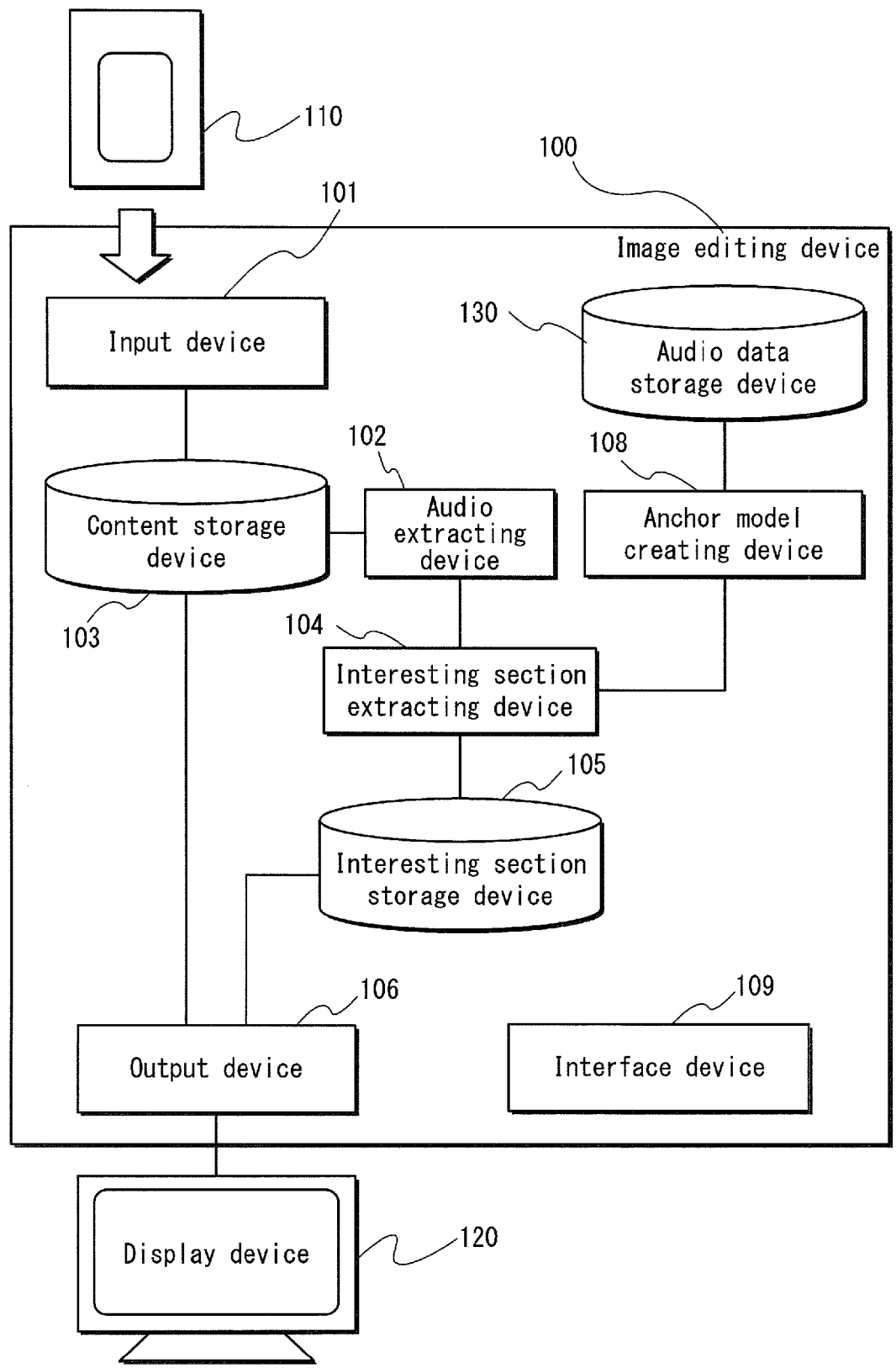
FIG. 6 illustrates the structure of an image editing device in which an interesting section extracting device of the embodiment is loaded.

FIG. 6 illustrates an image editing device 100 in which an interesting section extracting device 104 of the present embodiment is loaded.

<3-1> Overall Structure

As illustrated in FIG. 6, the image editing device 100 includes an input device 101, a content storage device 103, an audio extracting device 102, an interesting section extracting device 104, interesting section storage device 105, an output device 106, an anchor model creating device 108, an audio data storage device 130, and an interface device 109.

The input device 101 is composed of a disk drive device or the like, and when a recording medium 110 is loaded therein, the input device 101 reads a video file from the recording medium 110 and stores the video file in the content storage device 103.

The content storage device 103 is composed of a hard disk device or the like, and stores the video file that has been obtained from the recording medium 110 by the input device 101.

The audio extracting device 102 obtains a video file from the content storage device 103, extracts an audio signal from the obtained video file, and inputs the audio signal into the interesting section extracting device 104. Here, the audio extracting device 102 generates an audio signal as illustrated in FIG. 2A by performing a decoding process onto an encoded audio signal.

The output device 106 displays images on a display device 120. For this operation, the output device 106 obtains interesting section data from the output device 106, and selects a plurality of pieces of image data that constitute a part of the video file stored in the content storage device 103, based on the obtained interesting section data. That is to say, the output device 106 selects a plurality of pieces of image data that correspond to a plurality of pieces of time data indicating times that are determined from the interesting section data, respectively. Also, the output device 106 can display, on the external display device 120, a digest video which is composed of video images of respective interesting sections corresponding to the times specified by the user and arranged sequentially in an order of the specified times.

The audio data storage device 130 is composed of a hard disk device or the like, and stores audio data that is used by the anchor model creating device 108 when it creates the anchor models Ar that represent features of a plurality of types of sound pieces. The audio data is composed of a plurality of audio signals that have been obtained in advance by extracting audio signals from a plurality of video files and performing a decoding process on them, each of the plurality of video files being different from the video file from which interesting sections are to be extracted.

The interface device 109 includes an operation unit (not illustrated) such as a keyboard, and has a function to receive an input operation from the user and notify the interesting section extracting device 104 and/or the anchor model creating device 108 of information input by the user. The user inputs specification of time and information regarding length of an interesting section to the interesting section extracting device 104 via the interface device 109.

<3-2> Interesting Section Extracting Device

Figure 7:
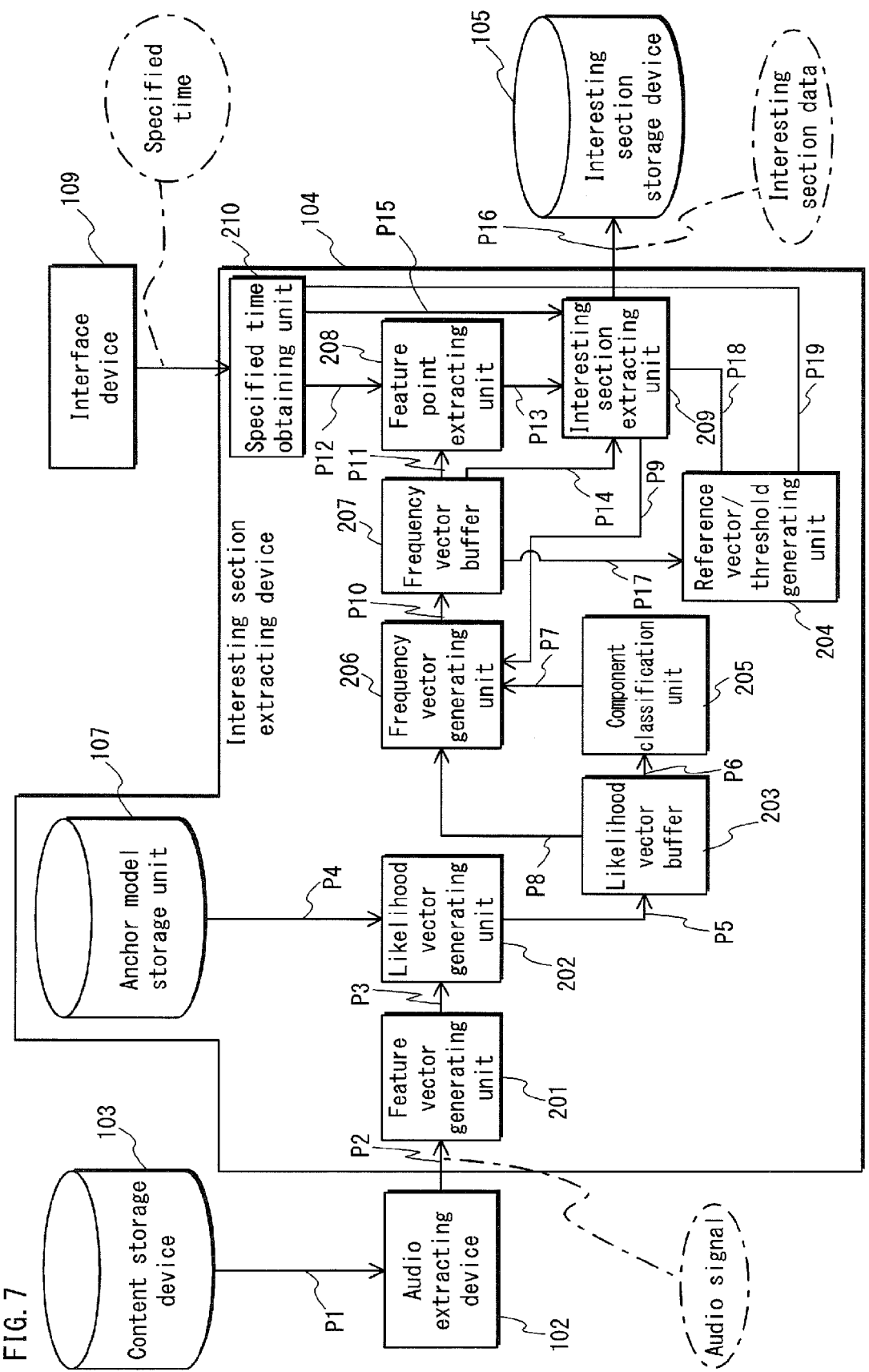
FIG. 7 is a functional block diagram of the interesting section extracting device of the embodiment.

The interesting section extracting device 104 includes a memory (not illustrated) and a processor (not illustrated), and realizes the structural elements illustrated in FIG. 7 when the processor executes programs read into the memory. The following explains the structural elements.

<3-2-1> Feature Vector Generating Unit

A feature vector generating unit 201 generates feature vectors from an input audio signal. The feature vector generating unit 201 first calculates the power spectrum S(ω) by performing an acoustic analysis onto an audio signal input from the audio extracting device 102, for each first unit section. The feature vector generating unit 201 then generates feature vectors M (M(1), M(2), . . . , M(26)) from the calculated power spectrum S(ω). The feature vector generating unit 201 generates 100 feature vectors M in total (see FIG. 3).

<3-2-2> Likelihood Vector Generating Unit

A likelihood vector generating unit 202 calculates likelihoods Lr for the feature vectors M by using the anchor models Ar of the sound pieces, and generates likelihood vectors F whose components are the calculated likelihoods Lr. The likelihood vector generating unit 202 obtains, from an anchor model storage unit 107, parameters that constitute the anchor models Ar.

<3-2-3> Likelihood Vector Buffer

A likelihood vector buffer 203 is composed of a partial area of the memory and stores the likelihood vectors F generated by the likelihood vector generating unit 202.

<3-2-4> Component Classification Unit

A component classification unit 205, in accordance with a relational equation [Equation 1] provided below, reads out all likelihood vectors F generated for all sections of the audio signal from the likelihood vector buffer 203, and calculates a centroid vector G by dividing the components of the total of the likelihood vectors F by the number of first unit sections included in all the sections.

$$G = \left( \sum_{t=1}^{T} \frac{L1(\tau)}{T}, \sum_{t=1}^{T} \frac{L1(\tau)}{T}, \dots, \sum_{t=1}^{T} \frac{LR(\tau)}{T} \right) =$$
$$(G1, G2, \dots, GR)$$ [Equation 1]

Here, the first unit section is 10 msec long. Thus when the length of all sections is set to one hour (3600 sec), T=360000. Also, since the likelihood vectors F are calculated by using 1024 types of anchor models Ar, R=1024.

Meanwhile, each component of the centroid vector G is an average value of likelihoods Lr of the anchor models Ar in the first unit sections included in all sections of the audio signal (the average value is also referred to as "normalized cumulative likelihood"). That is to say, the components of the centroid vector G represent appearance frequencies of the sound pieces indicated by the anchor models Ar in all sections of the audio signal, respectively. Accordingly, the larger a component of the centroid vector G is, the higher the appearance frequency of the sound piece indicated by the anchor model Ar corresponding to the component is. Note that, although in the present embodiment, an example where the appearance frequency of the sound piece is represented by the normalized cumulative likelihood is used, the representation of the appearance frequency is not limited to this.

The component classification unit 205 arranges the components of the calculated centroid vector G in ascending order. In this arrangement, the component classification unit 205 classifies components having ranks higher than ¼ of the total number of the types of the anchor models Ar, namely components having ranks higher than rank 256, into a high-frequency group composed of anchor models Ar having high appearance frequencies, and classifies the other components into a low-frequency group composed of anchor models Ar having low appearance frequencies. FIG. 8 illustrates how the component classification unit 205 arranges the components. In the histograms (a) and (b) presented in FIG. 8, the vertical axis indicates the size of components of the centroid vector G, and the horizontal axis indicates the components Gr of the centroid vector G anchor models Ar corresponding thereto.

<3-2-5> Frequency Vector Generating Unit

Figure 9:
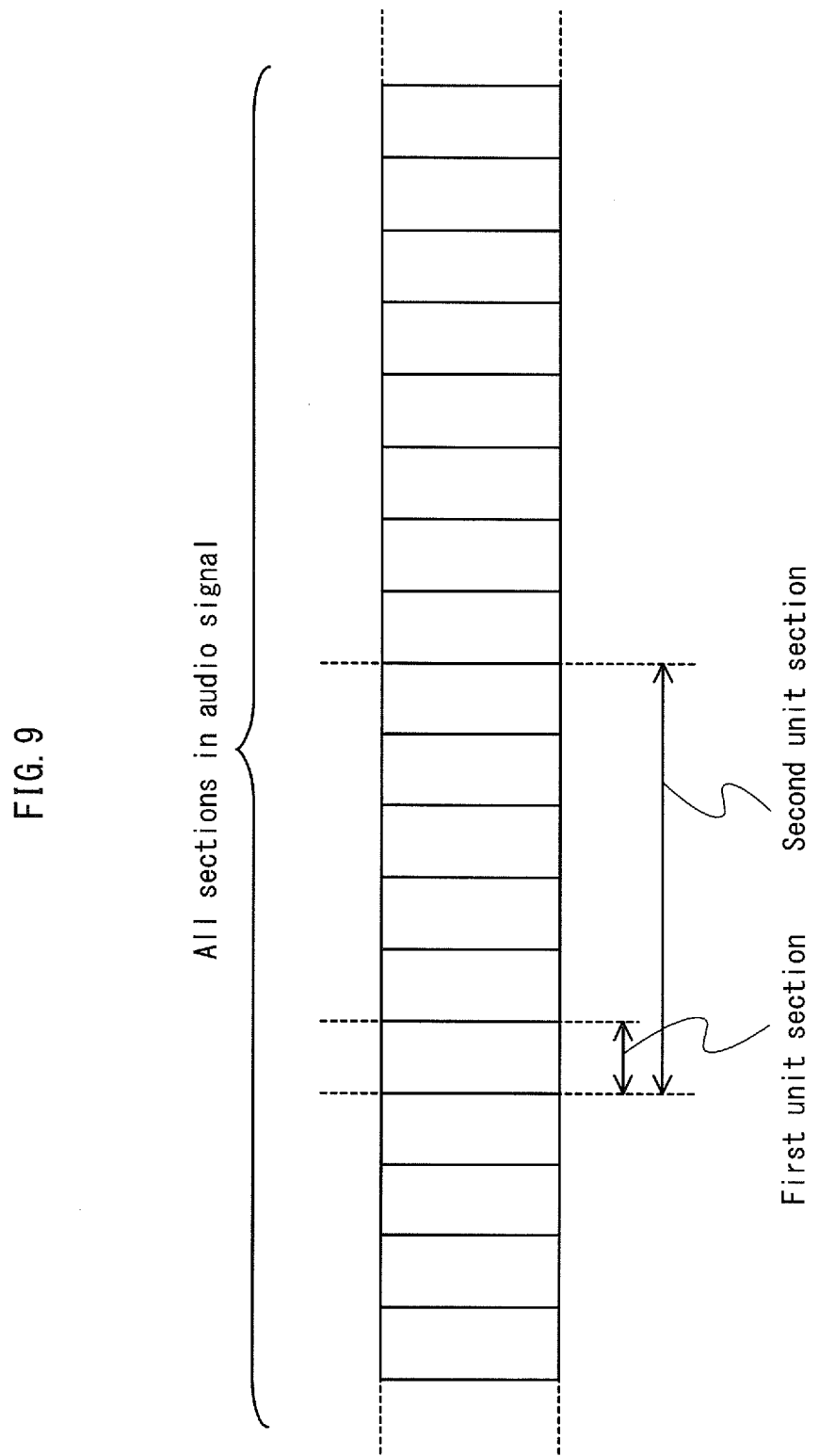
FIG. 9 illustrates relationships between the first unit section and the second unit section in the embodiment.

A frequency vector generating unit 206 generates frequency vectors NF one by one by sequentially shifting the section used for generating a frequency vector NF, by second unit section (by one second). As illustrated in FIG. 9, one second unit section corresponds to a set of a plurality of first unit sections. The components of the frequency vectors NF correspond to the normalized cumulative likelihoods of the components of the likelihood vectors F included in the second unit section. The upper part of FIG. 10 illustrates an example of frequency vectors NF.

The frequency vector generating unit 206 ends generating the frequency vectors NF when it receives a frequency vector generation end instruction (to be described below) from an interesting section extracting unit 209 (to be described below); and starts generating the frequency vectors NF when it receives a frequency vector generation start instruction.

The frequency vector generating unit 206, based on the classification results of the component classification unit 205, extracts, from the frequency vectors NF, components belonging to the high-frequency group composed of anchor models Ar having high appearance frequencies, and components belonging to the low-frequency group composed of anchor models Ar having low appearance frequencies, and generates a high-frequency vector NFh composed of components corresponding to the high-frequency group, and a low-frequency vector NF1 composed of components corresponding to the low-frequency group. Here, the frequency vector generating unit 206 generates the high-frequency vector NFh and the low-frequency vector NF1 by using attribute information (namely, information indicating to which of the high-frequency group and the low-frequency group each anchor model Ar belongs) that is input from the component classification unit 205.

<3-2-6> Frequency Vector Buffer

A frequency vector buffer 207 is composed of a part of the memory and stores the high-frequency vector NFh and the low-frequency vector NF1 generated by the frequency vector generating unit 206.

The lower part of FIG. 10 presents line graphs that show components of the high-frequency vector NFh and the low-frequency vector NF1, respectively.

<3-2-7> Reference Vector/Threshold Generating Unit

Figure 11:
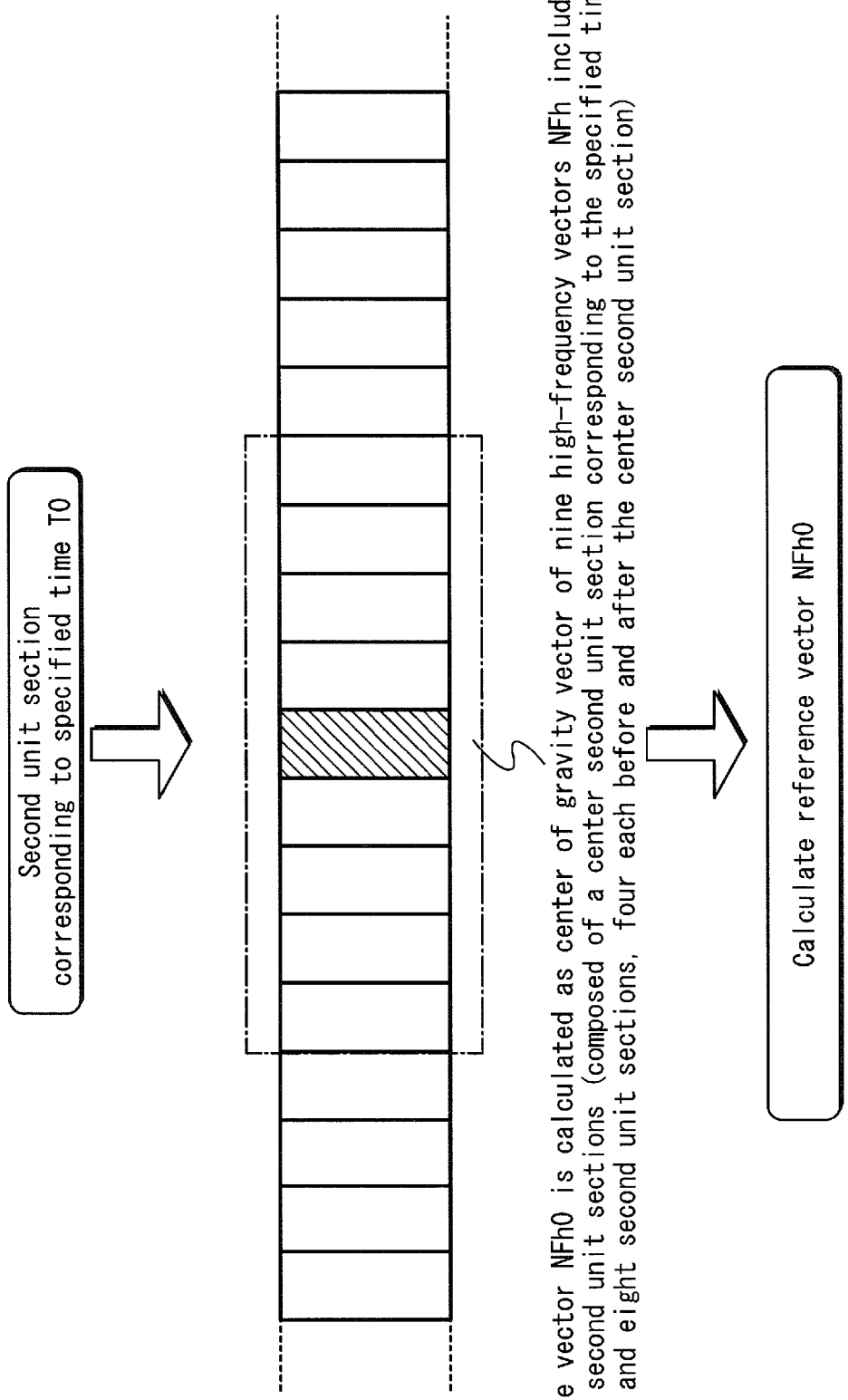
FIG. 11 illustrates an operation of the reference vector/threshold generating unit for generating the reference vector in the embodiment.

A reference vector/threshold generating unit 204 obtains a plurality of high-frequency vectors NFh included in a plurality of second unit sections from the frequency vector buffer 207 and calculates a reference vector NFh0, wherein the plurality of high-frequency vectors NFh include a high-frequency vector NFh that corresponds to the specified time. In the example illustrated in FIG. 11, the reference vector NFh0 is obtained by dividing, by the number of the second unit sections (nine), the total of nine high-frequency vectors NFh included in nine second unit sections (composed of a center second unit section corresponding to the specified time and eight second unit sections, four each before and after the center second unit section).

Figure 12:
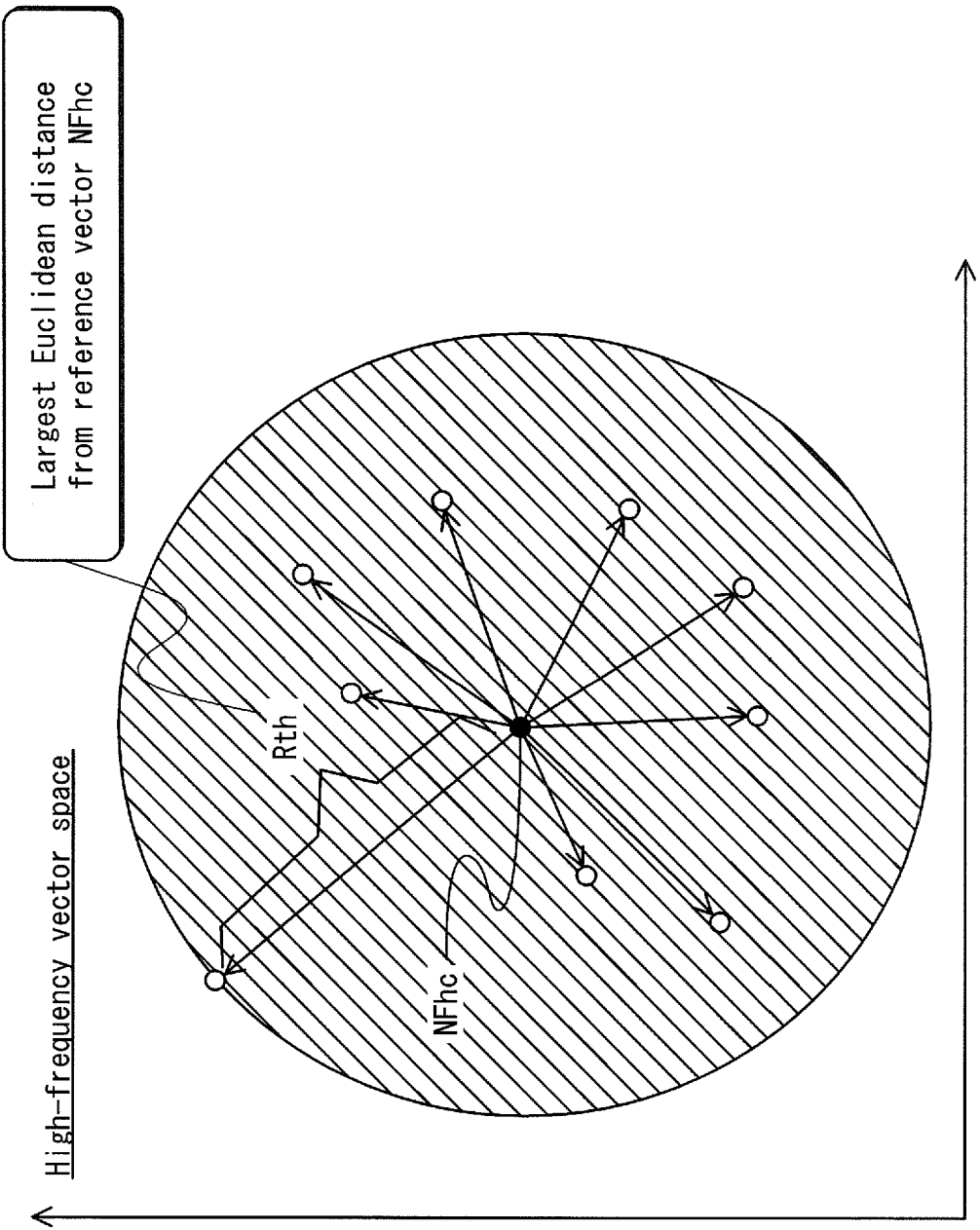
FIG. 12 illustrates an operation of the reference vector/threshold generating unit for calculating the threshold in the embodiment.

The reference vector/threshold generating unit 204 further calculates Euclidean distances between the reference vector NFh0 and the plurality of high-frequency vectors NFh that are used to generate the reference vector NFh0, and sets the largest Euclidean distance among the calculated Euclidean distances to a threshold Rth that is used to judge whether or not the target time belongs to the first feature section. FIG. 12 illustrates how the judgment is made, by using the concept of the high-frequency vector space.

The reference vector/threshold generating unit 204 then inputs the generated reference vector NFh0 and the threshold Rth into the interesting section extracting unit 209.

<3-2-8> Specified Time Obtaining Unit

A specified time obtaining unit 210 obtains information regarding the specified time from the interface device 109, and inputs the obtained information into the reference vector/threshold generating unit 204, feature point extracting unit 208, and interesting section extracting unit 209.

<3-2-9> Feature Point Extracting Unit

The feature point extracting unit 208 calculates the norm of a difference $\Delta(NF1(T)-NF1(T-1))$ between low-frequency vectors $NF1(T)$ and $NF1(T-1)$ at each time obtained by going back time by one second from the specified time T0.

The feature point extracting unit 208 detects a time that is closest to the specified time T0 among the times at which the norm of the difference $\Delta(NF1(T)-NF1(T-1))$ exceeds the threshold Th, and sets the detected time as a feature point (feature time). That is to say, the feature point extracting unit 208 searches for and extracts a feature point Tk which is the end time of the second feature section, by going back time by the second unit section from the specified time T0.

Figure 13:
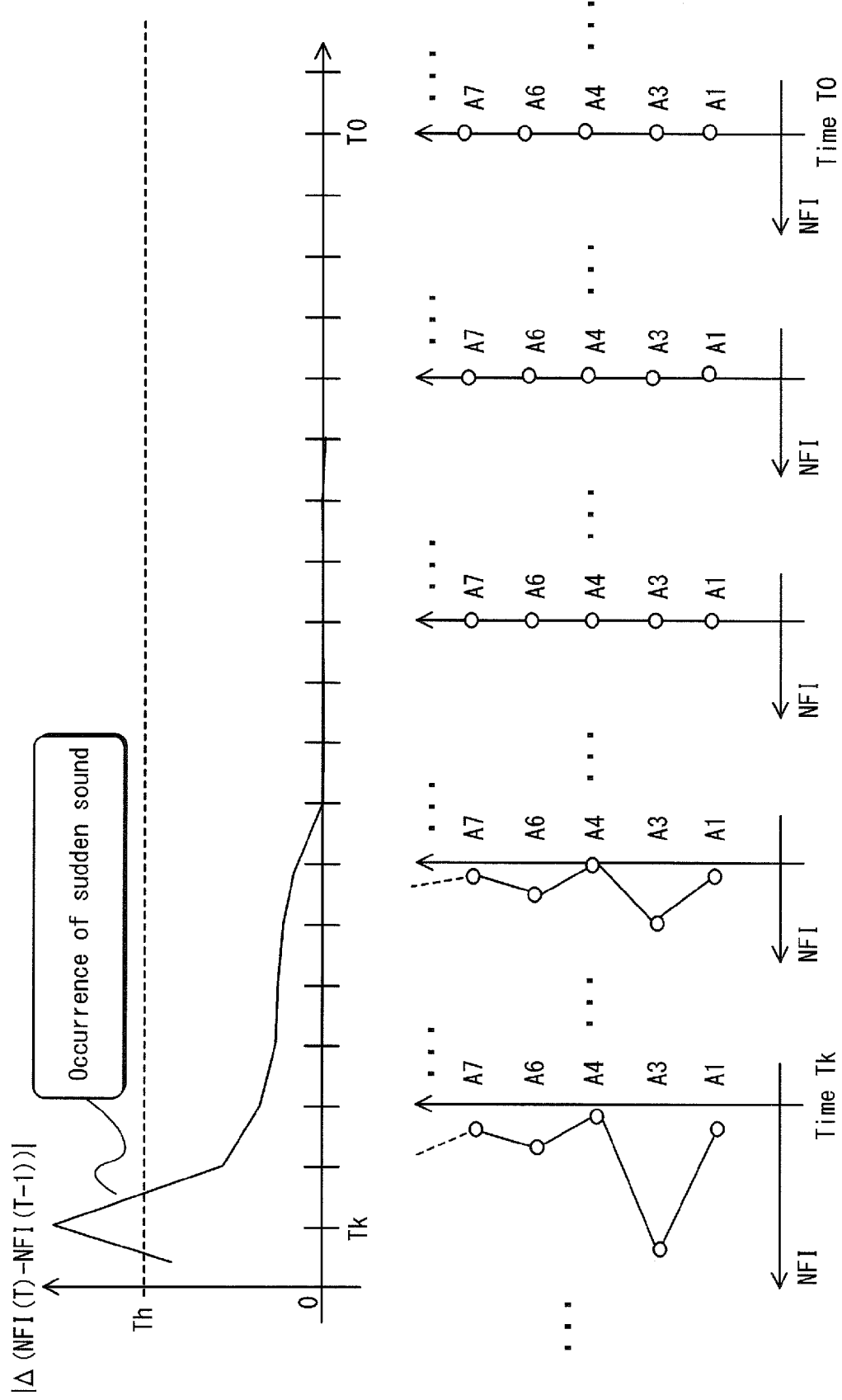
FIG. 13 illustrates an operation of the feature point extracting unit in the embodiment.

FIG. 13 illustrates an example of norms of the difference $\Delta(NF1(T)-NF1(T-1))$ between low-frequency vectors $NF1(T)$ and $NF1(T-1)$. In the example of FIG. 13, $|\Delta(NF1(T)-NF1(T-1))|$ exceeds the threshold Th at time Tk. Thus the time Tk is set as the feature point.

In this way, the feature point extracting unit 208 extract the feature point Tk that is the end time of the second feature section, by using information of the specified time input from the specified time obtaining unit 210 and the low-frequency vectors stored in the frequency vector buffer 207 (see FIG. 1). The information of the specified time is represented by an elapse time from the start time of the video file.

<3-2-10> Interesting Section Extracting Unit

The interesting section extracting unit 209 extracts a first feature section (candidate section) based on information concerning the specified time, the information being input from the specified time obtaining unit 210.

Figure 14:
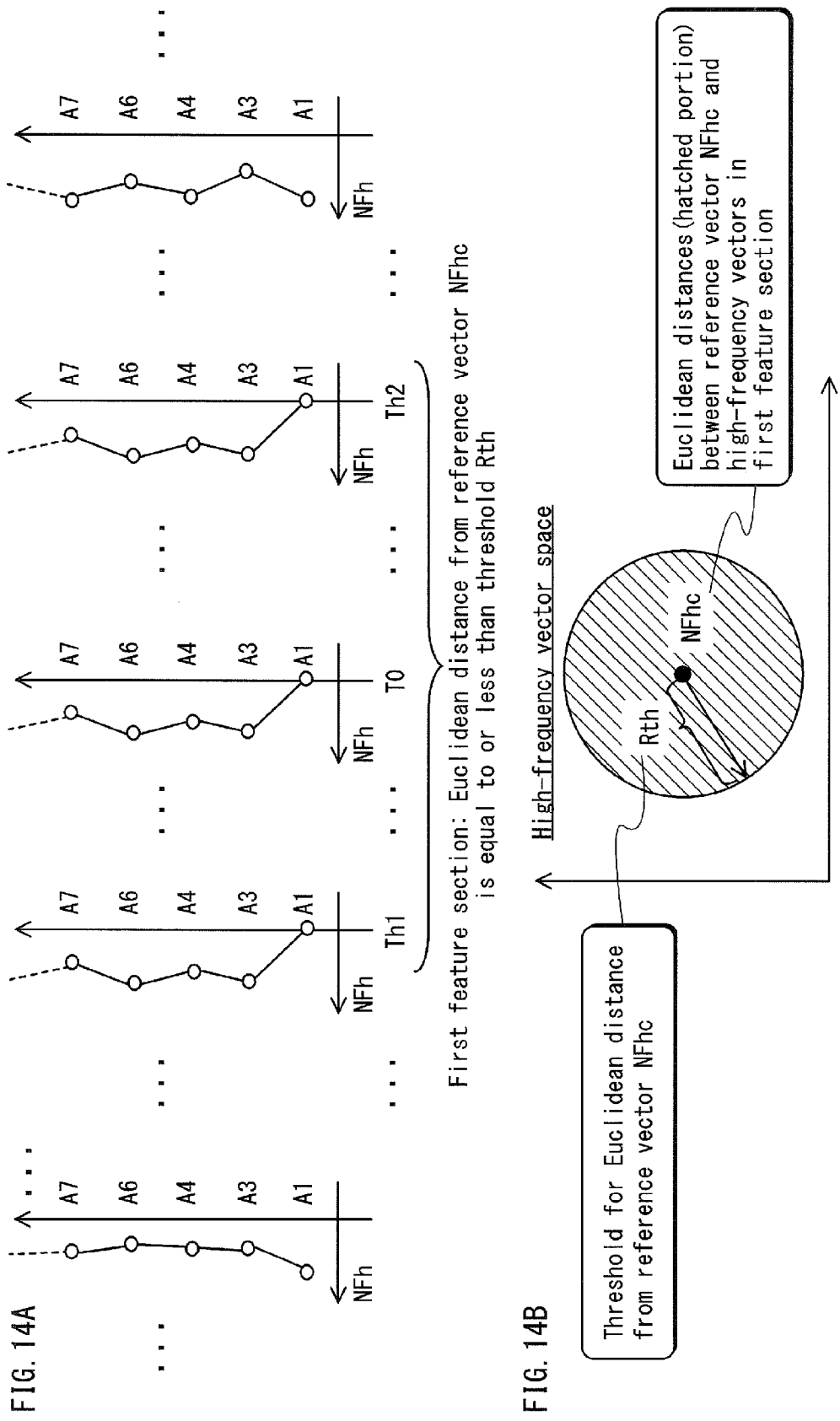
FIG. 14 illustrates high-frequency vectors included in a feature section in the embodiment.

The interesting section extracting unit 209 first identifies a second unit section that includes the specified time (time T0 illustrated in FIG. 14A). The interesting section extracting unit 209 then calculates Euclidean distances between the reference vector NFhc, which is input from the reference vector/threshold generating unit 204, and high-frequency vectors NFh at other times. Here, a section between times TL1 and TL2 at which Euclidean distances between the reference vector NFhc and the high-frequency vectors NFh exceed the threshold Rth, which is input from the reference vector/threshold generating unit 204, corresponds to the first feature section (see FIG. 14A). FIG. 14B illustrates relationship between the threshold and the Euclidean distances in the high-frequency vector space. The high-frequency vectors NFh in the first feature section exist within a sphere whose radius is the threshold Rth and whose center is the reference vector NFhc in the high-frequency vector space illustrated in FIG. 14B.

Figure 15:
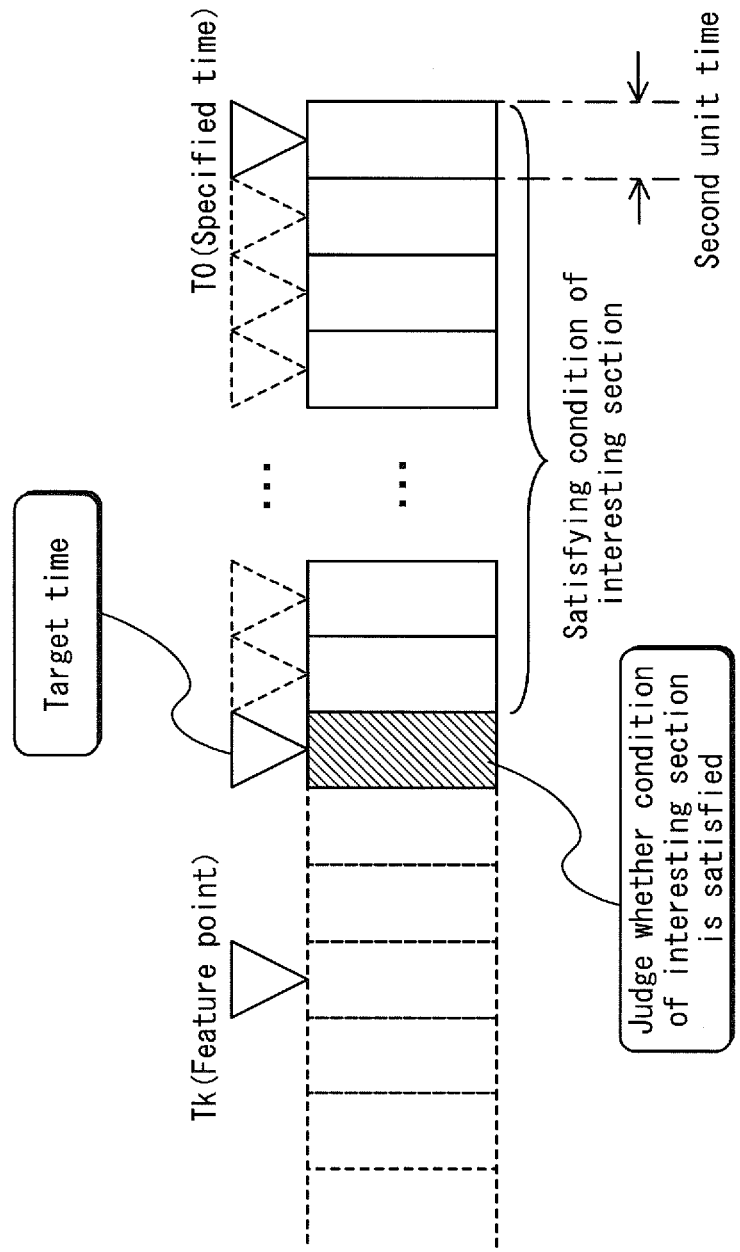
FIG. 15 illustrates an operation of the interesting section extracting unit 209 in the embodiment.

As illustrated in FIG. 15, the interesting section extracting unit 209 calculates the Euclidean distance between the reference vector NFhc and each high-frequency vector NFh at each target time that is obtained by going back time from the specified time T0 (that is to say, by sequentially shifting time by the second unit section from the specified time T0 toward the feature point Tk extracted by the feature point extracting unit 208), and judges whether or not the calculated Euclidean distance exceeds the threshold Rth (that is to say, whether or not the second unit section including the target time is included in the first feature section).

When the calculated Euclidean distance exceeds the threshold (Rth), the interesting section extracting unit 209 notifies the frequency vector generating unit 206 of a frequency vector generation end instruction.

The interesting section extracting unit 209 also judges whether or not the length between the target time and the specified time T0 is shorter than a predetermined length 1e of the interesting section. When the calculated Euclidean distance does not exceed the threshold Rth (that is to say, when the second unit section including the target time is included in the first feature section), and the length between the target time and the specified time T0 is shorter than the predetermined length 1e of the interesting section (that is to say, the condition of the interesting section is satisfied), then the second unit section including the target time is determined as the interesting section.

When the target time matches the feature point Tk, the interesting section extracting unit 209 judges whether or not the length between the target time and the specified time T0 is shorter than the predetermined length 1e of the interesting section. When it judges that the length is shorter than the predetermined length 1e, the interesting section extracting unit 209 calculates the Euclidean distance between the reference vector NFhc and each high-frequency vector NFh at each target time that is obtained by shifting time sequentially in the forward direction from the specified time T0 by the second unit section, and performs the same judgment as described above in sequence.

The interesting section extracting unit 209 notifies the frequency vector generating unit 206 of a frequency vector generation start instruction.

Figure 16:
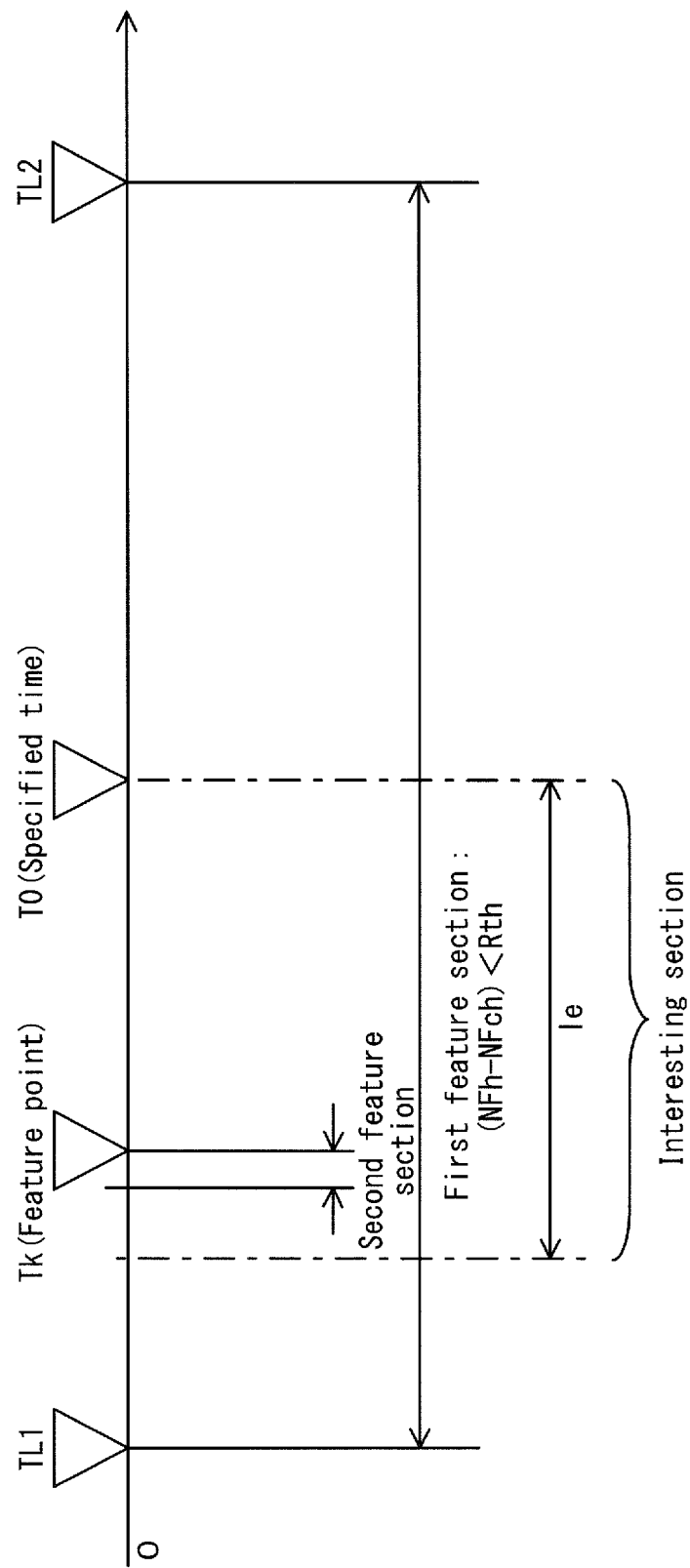
FIG. 16 illustrates relationships between the interesting section and the first and second feature sections in the embodiment.

When the calculated Euclidean distance exceeds the threshold Rth or when the total length of the section identified as the interesting section exceeds the predetermined length 1e of the interesting section, the interesting section extracting unit 209 ends the process and notifies the frequency vector generating unit 206 of the frequency vector generation end instruction. In this operation, a section having the length 1e including the feature point Tk is extracted as the interesting section from the first feature section (see FIG. 16).

Figure 17A:
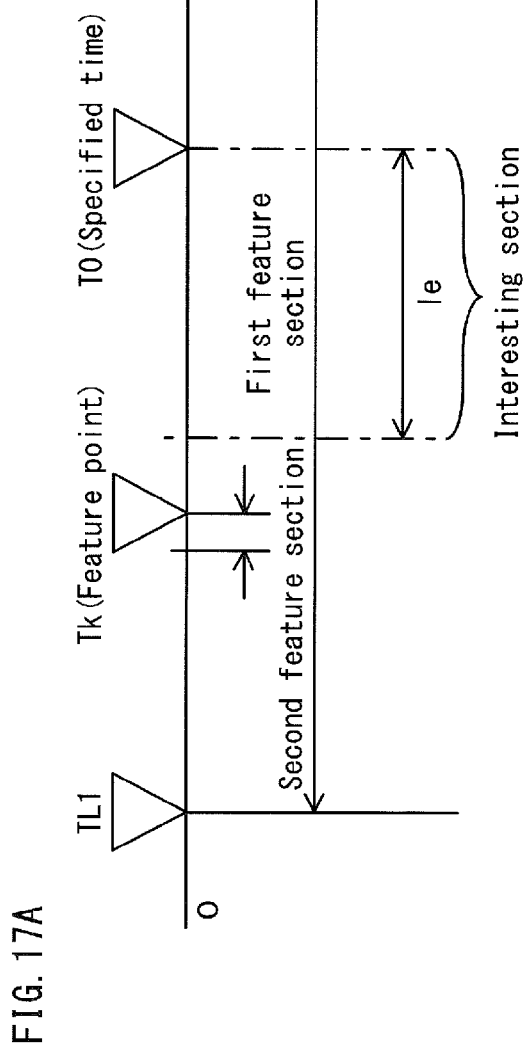
FIG. 17 illustrates relationships between the interesting section and the first and second feature sections in the embodiment.

The length 1e of the interesting section is determined in advance based on an user evaluation that is made by using a simple editing application (for example, the length 1e is determined as 60 seconds by the user evaluation). In the present example, the length 1e is determined as 60 sec and when the feature point Tk is 60 or more sec away from the specified time T0, a section that does not include the feature point Tk and is 60 sec in length is extracted as the interesting section, as illustrated in FIG. 17A. The interesting section is extracted in this way when, for example, the specified time T0 is 1000 sec, the feature point Tk is 900 sec, and the predetermined length 1e of the interesting section is 50 sec. In this case, the length 1e of the interesting section is shorter than the length between the feature point Tk and the specified time T0 (100 sec).

Figure 17B:
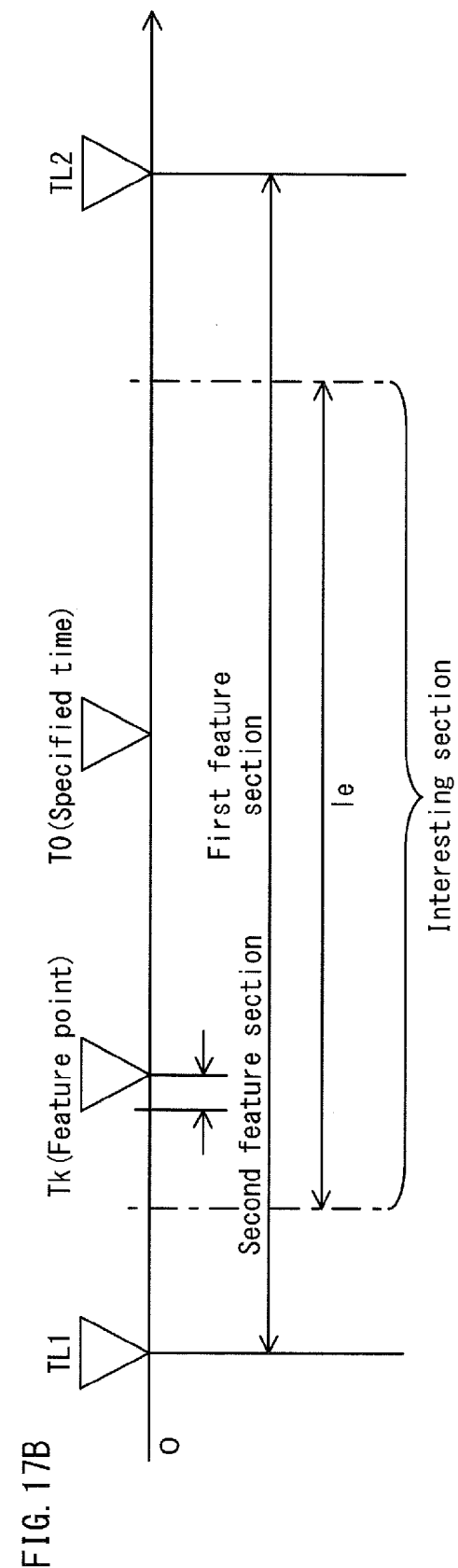

On the other hand, when the length between the specified time T0 and time TL1 is equal to or less than the predetermined length 1e of the interesting section, a section having the predetermined length 1e of the interesting section after the time TL1 is extracted as the interesting section, as illustrated in FIG. 17B. The interesting section is extracted in this way when, for example, the specified time T0 is 1000 sec, the time TL1 is 950 sec, and the predetermined length 1e of the interesting section is 60 sec. In this case, the length 1e of the interesting section is longer than the length between the time TL1 and the specified time T0 (50 sec).

<3-2-10> Anchor Model Storage Unit

The anchor model storage unit 107 is composed of a part of the memory and stores the anchor models Ar created by the anchor model creating device 108. The anchor model storage unit 107 stores the anchor models Ar in advance before the interesting section extraction process is performed.

<3-3> Anchor Model Creating Device

Figure 18:
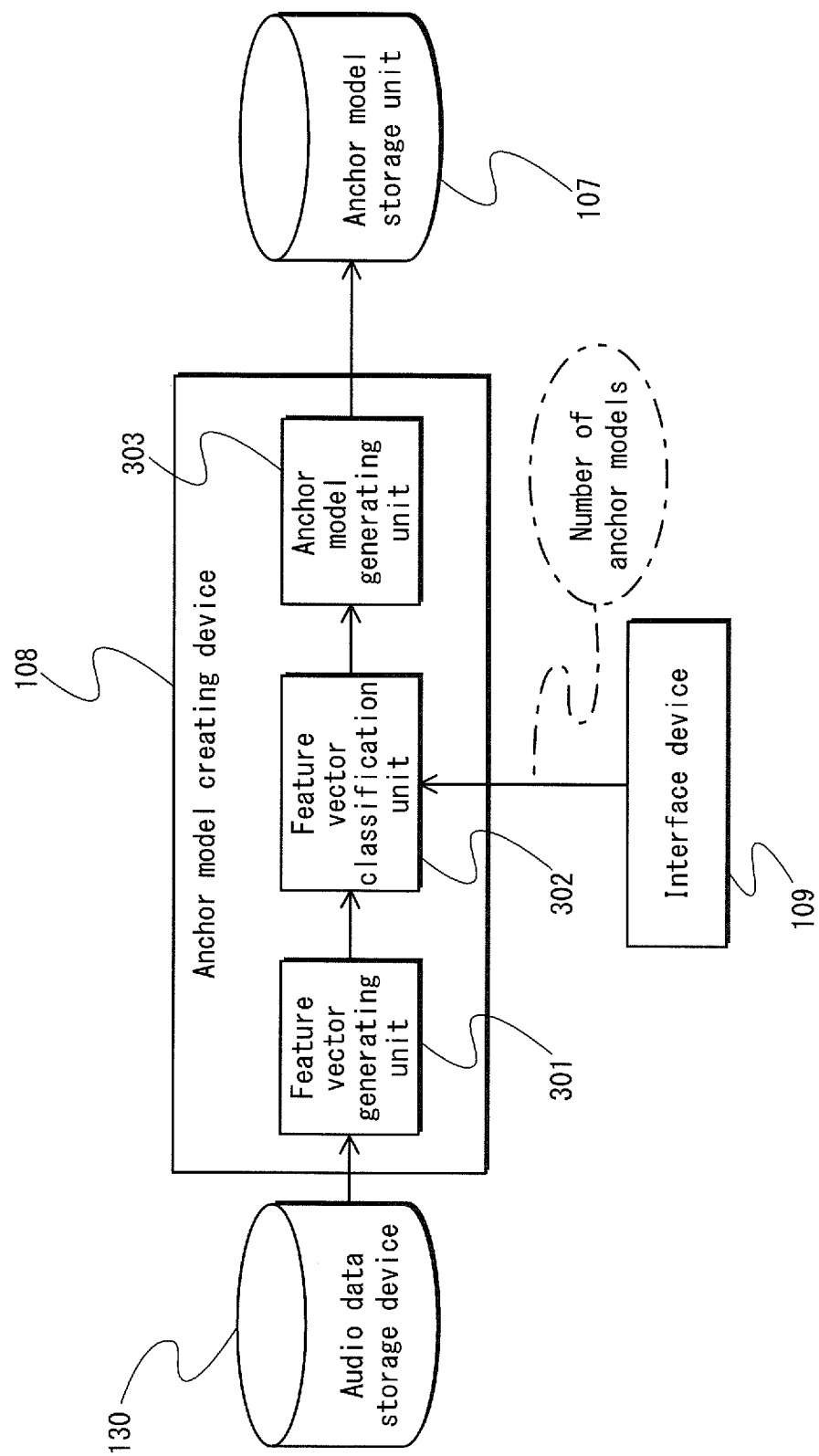
FIG. 18 is a functional block diagram illustrating the structure of the anchor model creating device in the embodiment.

FIG. 18 is a functional block diagram illustrating the structure of the anchor model creating device 108. The anchor model creating device 108 creates anchor models Ar from the audio data stored in the audio data storage device 130, and stores the created anchor models Ar in the anchor model storage unit 107.

The anchor model creating device 108 includes a memory (not illustrated) and a processor (not illustrated), and when the processor executes a program that is read into the memory, the structural elements illustrated in FIG. 18 are realized. That is to say, as illustrated in FIG. 18, the anchor model creating device 108 realizes a feature vector generating unit 301, a feature vector classification unit 302, and an anchor model generating unit 303.

<3-3-1> Feature Vector Generating Unit

The feature vector generating unit 301, in a similar manner to the feature vector generating unit 201 described in <3-2-1> above, divides audio data obtained from the audio data storage device 130 into first unit sections, calculates power spectrum $S(\omega)$ by performing an acoustic analysis for each first unit section, and generates feature vectors M from the calculated power spectrum $S(\omega)$.

<3-3-2> Feature Vector Classification Unit

The feature vector classification unit 302 separates a plurality of feature vectors M into K clusters by the K-means method, based on the value "K" that indicates the number of anchor models Ar that is input from the interface device 109, and calculates representative feature vectors that represent each cluster (hereinafter, the feature vectors are referred to as "cluster feature vectors"). These clusters correspond to the anchor models Ar on a one-to-one basis. In the present embodiment, it is set as K=1024.

<3-3-3> Anchor Model Generating Unit

The anchor model generating unit 303, based on the cluster feature vectors of the clusters, calculates feature appearance probability functions $b_{Ar}(M)$ that correspond to the anchor models Ar, respectively.

<4> Operation

<4-1> Operation of Image Editing Device

The following describes the operation of the image editing device 100 in which the interesting section extracting device 104 of the present embodiment is loaded.

Firstly, when the user specifies a video file from which an interesting section is to be extracted and displayed, the input device 101 obtains the video file from the recording medium 110 and stores the video file in the content storage device 103.

Secondly, the audio extracting device 102 extracts an audio signal from the video file stored in the content storage device 103.

Thirdly, the interesting section extracting device 104 performs the interesting section extraction process, which is described below, based on the audio signal extracted by the audio extracting device 102. In this interesting section extraction process, the extracted interesting section data is stored in the interesting section storage device 105.

Lastly, the output device 106 selects a plurality of pieces of image data corresponding to the interesting section data extracted from the video file in the interesting section extraction process, and displays images on the display device 120.

<4-2> Interesting Section Extraction Process

The following describes the interesting section extraction process in detail with reference to FIG. 7.

Firstly, the audio extracting device 102 extracts an audio signal from a video file which has been specified by the user, the video file being stored in the content storage device 103 (arrow P1), and inputs the extracted audio signal into the feature vector generating unit 201 (arrow P2).

The feature vector generating unit 201 then generates feature vectors from the input audio signal and inputs them into the likelihood vector generating unit 202 (arrow P3).

Next, the likelihood vector generating unit 202 generates, for each first unit section, likelihood vectors F from input feature vectors and the anchor models Ar obtained from the anchor model storage unit 107 (arrow P4), and stores the generated likelihood vectors F into the likelihood vector buffer 203 (arrow P5).

The component classification unit 205 obtains all likelihood vectors F stored in the likelihood vector buffer 203 (arrow P6), and calculates the centroid vector G of the likelihood vectors F, classifies, as the high-frequency group, anchor models Ar that correspond to components greater than a predetermined threshold, classifies, as the low-frequency group, anchor models Ar that correspond to components smaller than the predetermined threshold, and inputs attribute information, which indicates the classification results, into the frequency vector generating unit 206 (arrow P7).

The frequency vector generating unit 206 obtains a plurality of likelihood vectors F stored in the likelihood vector buffer 203 (arrow P8), and generates frequency vectors NF. The frequency vector generating unit 206 generates the high-frequency vector NFh and the low-frequency vector NFl by using the attribute information that is input from the component classification unit 205, and stores the high-frequency vector NFh and the low-frequency vector NFl into the frequency vector buffer 207 (arrow P10). This process ends when the frequency vector generation end instruction is notified from the interesting section extracting unit 209, and is resumed when the frequency vector generation start instruction is notified from the interesting section extracting unit 209 (arrow P9).

The feature point extracting unit 208 obtains the low-frequency vectors NFl from the frequency vector buffer 207 (arrow P11), and extracts a feature point that indicates the second feature section, by using the obtained low-frequency vectors NFl and information of the specified time that is input from the specified time obtaining unit 210 (arrow P12). In this operation, the feature point extracting unit 208 searches for and extracts the feature point Tk which is the end time of the second feature section, by sequentially going back time by the second unit section from the specified time T0.

When explained with reference to the example illustrated in FIG. 1, the feature point extracting unit 208 extracts an end time Tk of a section in which a sound of the starter gun continues, by sequentially going back time by the second unit section from the specified time T0 within a section (the first feature section) in which a music tune or the like indicating a footrace scene is continuously played.

Following this, the feature point extracting unit 208 inputs information of the extracted feature point into the interesting section extracting unit 209 (arrow P13).

On the other hand, the reference vector/threshold generating unit 204 obtains, from the frequency vector buffer 207, high-frequency vectors NFh including a high-frequency vector NFh that corresponds to the specified time (arrow P17), obtains information of the specified time from the specified time obtaining unit 210 (arrow P19), generates the reference vector NFh0, and calculates the threshold Rth. The reference vector/threshold generating unit 204 then inputs the generated reference vector NFh0 and the calculated threshold Rth into the interesting section extracting unit 209 (arrow P18).

Also, the interesting section extracting unit 209 judges whether or not the target time belongs to the first feature section, by using (i) the high-frequency vectors NFh obtained from the frequency vector buffer 207 (arrow P14), (ii) the reference vector NFhc and the threshold Rth input from the reference vector/threshold generating unit 204 (arrow P18), and (iii) information of the specified time input from the specified time obtaining unit 210 (arrow P15). In this judgment, the interesting section extracting unit 209 judges whether or not the target time belongs to the first feature section and the length between the target time and the specified time T0 is shorter than the predetermined length 1e of the interesting section, by sequentially shifting time by the second unit section from the specified time T0 toward the feature point Tk extracted by the feature point extracting unit 208. When it is judged that the target time belongs to the first feature section and the length between the target time and the specified time T0 is shorter than the predetermined length 1e of the interesting section, a second unit section including the target time is determined as the interesting section Explained in the example illustrated in FIG. 1, the interesting section extracting unit 209 judges whether or not the specified time is included in a section in which a music tune or the like indicating a footrace scene in the athletic meet scene is continuously played.

Lastly, using the calculated first feature section and the information of the feature point, the interesting section extracting unit 209 extracts the interesting section that is included in the first feature section and includes the second feature section, and stores interesting section data indicating the extracted interesting section into the interesting section storage device 105 (arrow P16). When explained with reference to the example illustrated in FIG. 1, the interesting section extracting unit 209 extracts, as the interesting section, a section that is included in a section (the first feature section) in which a music tune or the like indicating a footrace scene is continuously played, and includes a section (the second feature section) in which the sound of the starter gun continues, and stores data indicating the extracted interesting section into the interesting section storage device 105. In this process, when storing the data indicating the extracted interesting section into the interesting section storage device 105, the interesting section extracting unit 209 stores pieces of the interesting section data in an order of the specified times (for example, such that a piece of interesting section data corresponding to an earlier specified time is stored into a storage area with a lower address number). With this structure, when the output device 106 obtains a plurality of pieces of interesting section data from the interesting section storage device 105, the output device 106 does not need to perform a process of determining the interesting section data and ordinal relationships between the specified times corresponding to the interesting section data. Thus the structure reduces the processing load of the output device 106.

<Modifications>

In the above, the interesting section extracting device 104 of the present invention has been described in the embodiment. However, the present invention is not limited to the interesting section extracting device 104 described in the embodiment.

(1) In the above embodiment, it is described as one example that the interesting section extracting device: generates, for each first unit section (10 msec) of an audio signal included in a video file, feature vectors that represent the features of the audio signal; calculates likelihoods for the feature vectors by using a plurality of types of anchor models Ar; generates likelihood vectors whose components are the calculated likelihoods; classifies the components of the likelihood vectors into two component groups; and calculates end times of the first feature section (candidate section) and the second feature section based on the components belonging to the component groups. However, the present invention is not limited to the structure described in the embodiment.

For example, the interesting section extracting device 104 may extract the interesting section based on the amount of variation of similarity vectors composed of similarities between the feature vectors generated from the audio signal included in the video file and vectors that represent anchor models of the plurality of types of sound pieces.

(2) In the above embodiment, it is described that the audio data storage device 130 stores audio data corresponding to a plurality of AV contents. However, there is no limitation to the number or types of the AV contents.

(3) In the above embodiment, it is described as one example that the feature point Tk is extracted by sequentially going back time from the specified time T0. However, the present invention is not limited to this structure. For example, the feature point Tk may be extracted by sequentially shifting time in the forward direction from the specified time T0. Here, the feature point Tk corresponds to the start time of the second feature section. In this case, a section after the specified time T0 in the first feature section is extracted as the interesting section.

(4) In the above embodiment, it is described as one example that only the end time of the second feature section is extracted as the feature point Tk. However, the present invention is not limited to this structure. For example, both the start time and end time of the second feature section may be extracted.

According to the present modification, it is possible to extract the interesting section including the second feature section in a more reliable manner even if the duration for which a sudden sound continues varies greatly.

(5) In the above embodiment, it is described as one example that the specified time obtaining unit 210 obtains the specified time T0 that is input by the user via the interface device 109. However, the present invention is not limited to this structure. For example, the specified time obtaining unit 210 may obtain the specified time T0 automatically based on the variation over time of the features of a plurality of pieces of image data included in the video file.

In this modification, the specified time obtaining unit 210 may calculate a plurality of shift features for each of the plurality of pieces of image data included in the video file, by a general clustering method, and calculate the specified time T0 based on a predetermined difference in shift feature between image data. For example, focusing on shift features that represent respective background images of the plurality of image data, a time at which the difference in shift feature between two adjacent pieces of image data on a time axis greatly changes may be determined as the specified time T0 automatically.

Furthermore, in the above embodiment, it is described as one example that the specified time is provided as a time specified by the user. However, the present invention is not limited to this structure. For example, the specified time may be provided as a section defined by two times specified by the user. The two times defining this section may be, for example, the start time and the end time of the interesting section that are roughly specified by user.

In this case, information of the provided two times may be passed to the reference vector/threshold generating unit 204 and the reference vector/threshold generating unit 204 may generate the reference vector and the threshold based on the second unit sections that are present between the two times. Note that instead of passing the information of the provided two times to the reference vector/threshold generating unit 204, a so-called midpoint time between the two times may be passed to the feature point extracting unit 208 as the specified time T0.

Furthermore, the specified time obtaining unit 210 may obtain a specified time automatically, as well as obtaining a specified time via a user input. In this case, for example, using the low-frequency vectors generated by the frequency vector generating unit 206, the Euclidean distance between a previous time and the current time of each low-frequency vector may be calculated in sequence from the start of data indicating the low-frequency vectors, and a time at which the calculated Euclidean distance exceeds a predetermined threshold may be determined as the specified time T0 automatically.

(6) In the above embodiment, it is described as one example that the anchor models Ar for a plurality of types of sound pieces are created automatically from the audio data stored in the audio data storage device 130 (that is to say, the anchor models are created without so-called teachers). However, the present invention is not limited to this structure. For example, when the number of types of the sound pieces is limited to a small number (for example, several tens of types), the user may select pieces of audio data in correspondence with sound pieces from the audio data stored in the audio data storage device 130, assign type labels to the selected pieces of audio data, and create anchor models of the corresponding sound pieces from one or more pieces of audio data to which the same type label is assigned (that is to say, the anchor models are created with use of so-called teachers).

(7) A program composed of program codes for causing a processor of the interesting section extracting device and various types of circuits connected to the processor to perform the interesting section extraction process described in the embodiment may be recorded on a recording medium or distributed via any of various types of communication paths. The recording mediums for the above purpose include an IC (Integrated Circuit) card, a hard disk, an optical disc, a flexible disk, a ROM (Read Only Memory), etc. A distributed control program is stored for use in a memory or the like that can be read by a processor, and when the processor executes the control program, the functions described in the embodiment are realized. A part of the control program may be transmitted via any of various types of communication paths to a program-executable device that is separate from the video editing device, and the part of the control program may be executed in the program-executable device.

(8) Part or all of the structural elements constituting the interesting section extracting device described in the embodiment may be implemented on one or more integrated circuits (IC, LSI, etc.). Furthermore, the structural elements of the interesting section extracting device and one or more other elements may be implemented as an integrated circuit (on one chip).

Although the term "LSI" is used here, it may be called IC, system LSI, super LSI, ultra LSI or the like, depending on the level of integration. Also, an integrated circuit may not necessarily be manufactured as an LSI, but may be achieved by a dedicated circuit or a general-purpose processor. It is also possible to use the FPGA (Field Programmable Gate Array), with which a programming is available after the LSI is manufactured, or the reconfigurable processor that can re-configure the connection or setting of the circuit cells within the LSI. Furthermore, a technology for an integrated circuit that replaces the LSI may appear in the near future as the semiconductor technology improves or branches into other technologies. In that case, the new technology may be incorporated into the integration of the functional blocks constituting the present invention as described above. Such possible technologies include biotechnology.

The interesting section extracting device and the interesting section extracting method of the present invention is useful as a technology for editing an AV content by extracting an interesting section that is a target of interest of a user from an audio signal of the AV content that includes a sound/voice, sound within a house, outdoor sound or the like.

REFERENCE SIGNS LIST

102 audio extracting device
103 content storage device
104 interesting section extracting device
105 interesting section storage device
106 output device
107 anchor model storage unit
108 anchor model creating device
109 interface device
130 audio data storage device
201, 301 feature vector generating unit
202 likelihood vector generating unit
206 frequency vector generating unit
205 component classification unit
208 feature point extracting unit
209 interesting section extracting unit
302 feature vector classification unit
303 anchor model generating unit

The invention claimed is:

1. An interesting section extracting device, comprising:
an anchor model storage unit storing anchor models that respectively represent features of a plurality of types of sound pieces;
a specified time obtaining unit configured to obtain a specified time;
a likelihood vector generating unit configured to calculate likelihoods for feature vectors that represent features of an audio signal, in one-to-one correspondence with unit sections of the audio signal by using the anchor models, and generate likelihood vectors having the calculated likelihoods as components thereof; and
an interesting section extracting unit configured to calculate a candidate section, which is a candidate for an interesting section to be extracted from the video file, by using the likelihood vectors and extract, as the interesting section, a part or a whole of the candidate section including the specified time,
wherein the interesting section extracting device extracts the interesting section interesting to a user from the video file with reference to the audio signal included in the video file such that the specified time is included in the interesting section.

2. The interesting section extracting device of claim 1, further comprising:
a frequency vector generating unit configured to generate frequency vectors from N likelihood vectors generated by the likelihood vector generating unit, wherein each of the unit sections is a first unit section, N is a natural number of 2 or more, and the N likelihood vectors are generated from a second unit section of the audio signal that is N times the first unit section in length, wherein
the frequency vectors are used in the calculation of the candidate section.

3. The interesting section extracting device of claim 2, further comprising:
a component classification unit configured to classify components of the frequency vectors into a plurality of component groups; and
a feature section calculating unit configured to calculate a plurality of feature sections by using the plurality of component groups, respectively, wherein
the candidate section is defined by the plurality of feature sections.

4. The interesting section extracting device of claim 3, wherein
the component classification unit calculates a centroid vector from likelihood vectors of all sections of the audio signal, and classifies the components of the frequency vectors into a first component group and a second component group in accordance with size of each component of the centroid vector, and
the feature section calculating unit calculates a first feature section by using one or more components of the centroid vector belonging to the first component group, and calculates a second feature section by using one or more components of the centroid vector belonging to the second component group.

5. The interesting section extracting device of claim 4, wherein
the interesting section is a section that is included in the first feature section and includes the second feature section.

6. The interesting section extracting device of claim 5, further comprising:
an interesting section length obtaining unit configured to obtain an interesting section length which is a length set in advance for the interesting section by the user; and
a feature time extracting unit configured to search the second feature section for a feature time by sequentially shifting time by the second unit section from the specified time and extract the feature time, wherein
the interesting section extracting unit judges whether or not a target time belongs to the first feature section, and a length between the target time and the specified time is shorter than a predetermined interesting section length, by sequentially shifting time by the second unit section from the specified time toward the feature time extracted by the feature time extracting unit, then upon judging that the target time belongs to the first feature section and the length between the target time and the specified time is shorter than the predetermined interesting section length, determines the second unit section including the target time as the interesting section.

7. The interesting section extracting device of claim 6, wherein
the video file corresponds to a video representing one content.

8. The interesting section extracting device of claim 7, wherein
the interesting section extracting unit stores a plurality of interesting sections, which correspond respectively to a plurality of specified times, in a state of being arranged in an order of the plurality of specified times into an external storage device.

9. The interesting section extracting device of claim 8, wherein
the specified time obtaining unit obtains the plurality of specified times automatically from sections specified by the user, based on variation over time of features of a plurality of pieces of image data that correspond to the sections and are included in the video file.

10. An interesting section extracting method for an interesting section extracting device, comprising:
storing anchor models that respectively represent features of a plurality of types of sound pieces;
obtaining a specified time;
calculating likelihoods for feature vectors that represent features of an audio signal, in one-to-one correspondence with unit sections of the audio signal by using the anchor models, and generating likelihood vectors having the calculated likelihoods as components thereof; and
calculating a candidate section, which is a candidate for an interesting section to be extracted from the video file, by using the likelihood vectors and extracting, as the interesting section, a part or a whole of the candidate section including the specified time,
wherein the interesting section extracting method extracts the interesting section interesting to a user from the video file with reference to the audio signal included in the video file such that the specified time is included in the interesting section.

11. A non-transitory computer-readable recording medium storing a program causing an interesting section extracting device to perform steps comprising:
storing anchor models that respectively represent features of a plurality of types of sound pieces;
obtaining a specified time;
calculating likelihoods for feature vectors that represent features of an audio signal, in one-to-one correspondence with unit sections of the audio signal by using the anchor models, and generating likelihood vectors having the calculated likelihoods as components thereof; and
calculating a candidate section, which is a candidate for an interesting section to be extracted from the video file, by using the likelihood vectors and extracting, as the interesting section, a part or a whole of the candidate section including the specified time,
wherein the interesting section extracting device extracts the interesting section interesting to a user from the video file with reference to the audio signal included in the video file such that the specified time is included in the interesting section.

12. An interesting section extracting integrated circuit for an interesting section extracting device, comprising:
an anchor model storage unit storing anchor models that respectively represent features of a plurality of types of sound pieces;
a specified time obtaining unit configured to obtain a specified time;
a likelihood vector generating unit configured to calculate likelihoods for feature vectors that represent features of an audio signal, in one-to-one correspondence with unit sections of the audio signal by using the anchor models, and generate likelihood vectors having the calculated likelihoods as components thereof; and an interesting section extracting unit configured to calculate a candidate section, which is a candidate for an interesting section to be extracted from the video file, by using the likelihood vectors and extract, as the interesting section, a part or a whole of the candidate section including the specified time, wherein the interesting section extracting device extracts the interesting section interesting to a user from the video file with reference to the audio signal included in the video file such that the specified time is included in the interesting section.

\* \* \* \* \*